(12) United States Patent
Fujita

(10) Patent No.: US 11,904,958 B2
(45) Date of Patent: Feb. 20, 2024

(54) DETECTION DEVICE, CALCULATION DEVICE, CONTROL DEVICE, AND ELECTRIC POWER STEERING DEVICE USING THE SAME

(71) Applicant: DENSO CORPORATION, Kariya (JP)

(72) Inventor: Toshihiro Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 762 days.

(21) Appl. No.: 17/025,112

(22) Filed: Sep. 18, 2020

(65) Prior Publication Data

US 2021/0001919 A1 Jan. 7, 2021

Related U.S. Application Data

(63) Continuation of application No. PCT/JP2019/011435, filed on Mar. 19, 2019.

(30) Foreign Application Priority Data

Mar. 20, 2018 (JP) .................................. 2018-052369
Feb. 12, 2019 (JP) .................................. 2019-022545

(51) Int. Cl.
*B62D 5/04* (2006.01)
*B62D 6/00* (2006.01)
(Continued)

(52) U.S. Cl.
CPC ........... *B62D 5/0481* (2013.01); *B62D 5/046* (2013.01); *B62D 5/049* (2013.01); *B62D 6/002* (2013.01);
(Continued)

(58) Field of Classification Search
None
See application file for complete search history.

(56) References Cited

U.S. PATENT DOCUMENTS

2009/0058407 A1\* 3/2009 Kanekawa ............... G01D 5/14
324/228
2014/0203384 A1\* 7/2014 Deak ...................... H10N 50/80
257/427

(Continued)

FOREIGN PATENT DOCUMENTS

JP 2008-008233 A 1/2006

*Primary Examiner* — Jas A Sanghera
(74) *Attorney, Agent, or Firm* — MASCHOFF BRENNAN

(57) ABSTRACT

A main detection element detects a physical quantity that changes according to a rotation of a detection target. A sub detection element detects a physical quantity that changes according to the rotation of the detection target. A signal processing unit outputs main rotation information that is information corresponding to a detection value of the main detection element and sub rotation information that is information corresponding to a detection value of the sub detection element. A package seals the main detection element, the sub detection element, and the signal processing unit. Centers of all the main and the sub detection elements are arranged at positions shifted from a detection center of the detection target. The main detection element is arranged at a position closer to the detection center than the sub detection element. The package is arranged at a position where a center of the package deviates from the detection center.

20 Claims, 26 Drawing Sheets

(51) Int. Cl.
   *B62D 15/02*    (2006.01)
   *G01D 5/14*    (2006.01)

(52) U.S. Cl.
   CPC ........ *B62D 15/0235* (2013.01); *B62D 5/0403* (2013.01); *B62D 5/0406* (2013.01); *B62D 5/0463* (2013.01); *G01D 5/145* (2013.01)

(56) References Cited

U.S. PATENT DOCUMENTS

| | | | |
|---|---|---|---|
| 2014/0229062 A1* | 8/2014 | Kimura | B62D 6/10 |
| | | | 701/41 |
| 2016/0223363 A1 | 8/2016 | Fujita et al. | |
| 2016/0339958 A1* | 11/2016 | Fujita | B62D 15/021 |
| 2017/0163182 A1* | 6/2017 | Fedigan | G01R 33/072 |
| 2018/0087889 A1* | 3/2018 | Ausserlechner | G01D 5/147 |
| 2018/0372475 A1* | 12/2018 | Yoshiya | G01B 7/30 |
| 2019/0064016 A1* | 2/2019 | Rey | B62D 15/0215 |
| 2019/0152524 A1 | 5/2019 | Fujita et al. | |

\* cited by examiner the present disclosure will become more apparent from the following detailed description made with reference to the accompanying drawings. In the drawings:

DETECTION DEVICE, CALCULATION DEVICE, CONTROL DEVICE, AND ELECTRIC POWER STEERING DEVICE USING THE SAME

CROSS REFERENCE TO RELATED APPLICATION

This application is a continuation application of International Patent Application No. PCT/JP2019/011435 filed on Mar. 19, 2019, which designated the U.S. and based on and claims the benefits of priorities of Japanese Patent Application No. 2018-52369 filed on Mar. 20, 2018, and Japanese Patent Application No. 2019-22545 filed on Feb. 12, 2019. The entire disclosure of all of the above applications is incorporated herein by reference.

TECHNICAL FIELD

The present disclosure relates to a detection device, a calculation device, a control device, and an electric power steering device using the same.

BACKGROUND

Conventionally, a rotation angle detection device has a plurality of sensor units.

SUMMARY

An object of the present disclosure is to provide a detection device, a calculation device, a control device, and an electric power steering device using the control device, which can secure detection accuracy while suppressing an increase in the size of a detection target.

A detection device according to a present disclosure includes a main detection element, a sub detection element, a signal processing unit, and a package. The main detection element detects a physical quantity that changes according to a rotation of a detection target. The sub detection element detects a physical quantity that changes according to the rotation of the detection target. The signal processing unit outputs main rotation information that is information corresponding to the detection value of the main detection element and sub rotation information that is information corresponding to the detection value of the sub detection element. The package seals the main detection element, the sub detection element, and the signal processing unit.

In a first mode and a second mode, centers of all the main and the sub detection elements are arranged at positions shifted from a detection center of the detection target. The main detection element is arranged at a position closer to the detection center than the sub detection element. In the first mode, the package is arranged at a position where a center of the package is shifted from the detection center. In the second mode, the sub detection element is arranged at a position shifted from a straight line connecting a center of the main detection element and the detection center. In a third mode, the configuration relating to the elements differs between the main detection element and the sub detection element.

A calculation device according to the present disclosure includes a signal acquisition unit, an arithmetic unit, and an abnormality determination unit. The signal acquisition unit acquires sub rotation information corresponding to a detection value of the sub detection element arranged at a position deviated from the detection center of the detection target, and main rotation information corresponding to a detection value of the main detection element arranged at a position which is deviated from the detection center of the detection target and is closer to the detection center than the sub detection element. The arithmetic unit performs a control calculation based on the main rotation information. The abnormality determination unit determines an abnormality based on the main rotation information and the sub rotation information.

A control device of the present disclosure includes a detection device and a calculation device. The detection device has a main detection element, a sub detection element, and a signal processing unit. The main detection element detects a physical quantity that changes according to a rotation of a detection target. The sub detection element detects a physical quantity that changes according to the rotation of the detection target. The signal processing unit outputs main rotation information corresponding to the detection value of the main detection element and sub rotation information corresponding to the detection value of the sub detection element.

The calculation device has a control unit including a signal acquisition unit, a calculation unit, and an abnormality determination unit. The signal acquisition unit acquires main rotation information and sub rotation information from the detection device. The calculation unit performs a control calculation using the main rotation information. The abnormality determination unit determines an abnormality of the detection device based on the main rotation information and the sub rotation information.

The centers of all the main detection elements and the sub detection elements are arranged at positions shifted from the detection center of the detection target. The main detection element is arranged at a position closer to the detection center than the sub detection element. Thereby, it is possible to ensure a detection accuracy of the main detection element while suppressing an increase in the size of the detection target. Further, since the control calculation is performed using the main rotation information based on the detection value of the main detection element, the control calculation can be performed with high accuracy.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, a detection device, a calculation device, a control device, and an electric power steering device using the same according to the present disclosure will be described with reference to the drawings. Hereinafter, in a plurality of embodiments, a substantially equivalent configuration will be denoted by an identical reference, and explanation thereof will be omitted.

First Embodiment

Figure 1:
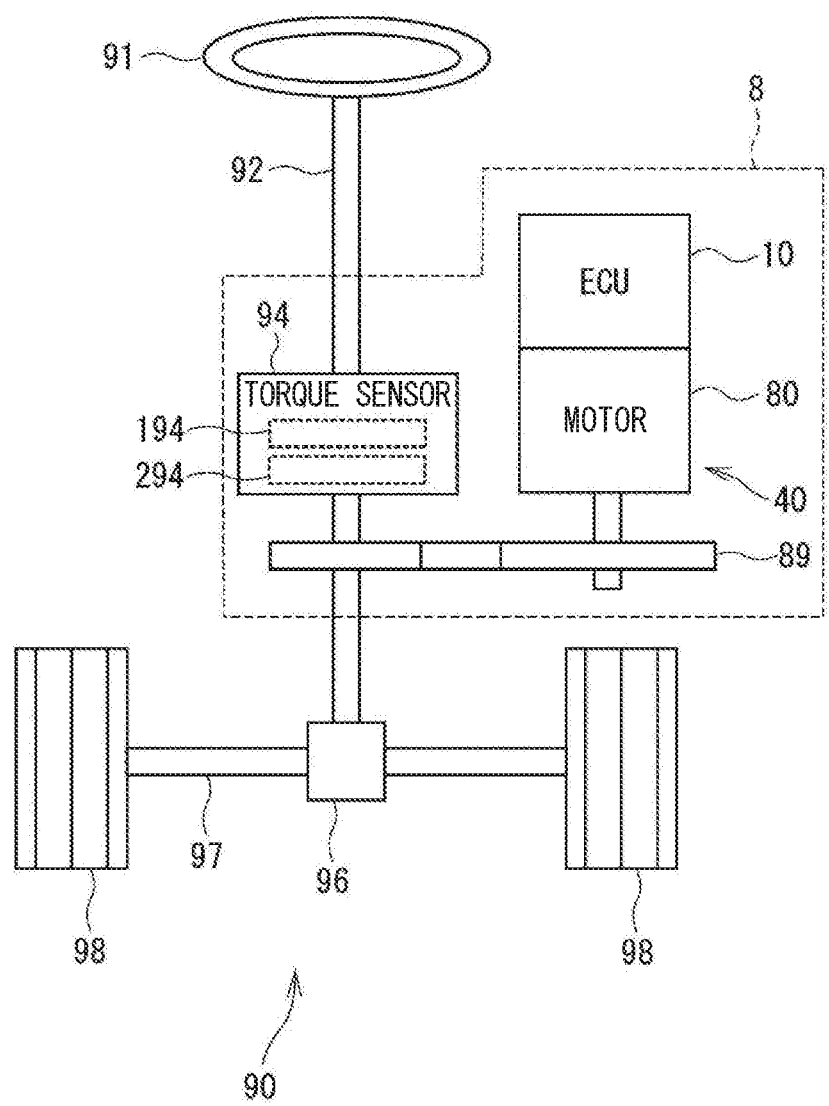
FIG. 1 is a schematic configuration diagram of a steering system according to a first embodiment.

As shown in FIG. 1, an ECU 10 as a control device according to the first embodiment is applied to an electric power steering device 8 for assisting a steering operation of a vehicle together with a motor 80 as a rotating electric machine. FIG. 1 shows an overall configuration of a steering system 90 including the electric power steering device 8. The steering system 90 includes a steering wheel 91 as a steering member, a steering shaft 92, a pinion gear 96, a rack shaft 97, wheels 98, the electric power steering device 8, and the like.

The steering wheel 91 is connected to the steering shaft 92. A torque sensor 94 is provided on the steering shaft 92 to detect a steering torque Ts. The torque sensor 94 includes a first torque detection unit 194 and a second torque detection unit 294. The pinion gear 96 is provided at an axial end of the steering shaft 92. The pinion gear 96 meshes with a rack shaft 97. The pair of wheels 98 is connected to both ends of the rack shaft 97 through tie rods or the like.

When a driver rotates the steering wheel 91, the steering shaft 92 connected to the steering wheel 91 rotates. A rotational movement of the steering shaft 92 is converted into a linear movement of the rack shaft 97 by the pinion gear 96. The pair of wheels 98 is steered to an angle corresponding to the displacement amount of the rack shaft 97.

The electric power steering device 8 includes a driving device 40, which includes the motor 80 and the ECU 10, and includes a reduction gear 89 or the like as a power transmission mechanism that reduces the rotation of the motor 80 and transmits the rotation to the steering shaft 92. The electric power steering device 8 of the present embodiment is a column assist type. It may alternatively be a rack assist type that transmits the rotation of the motor 80 to the rack shaft 97. In the present embodiment, the steering shaft 92 corresponds to a "drive target".

Figure 2:
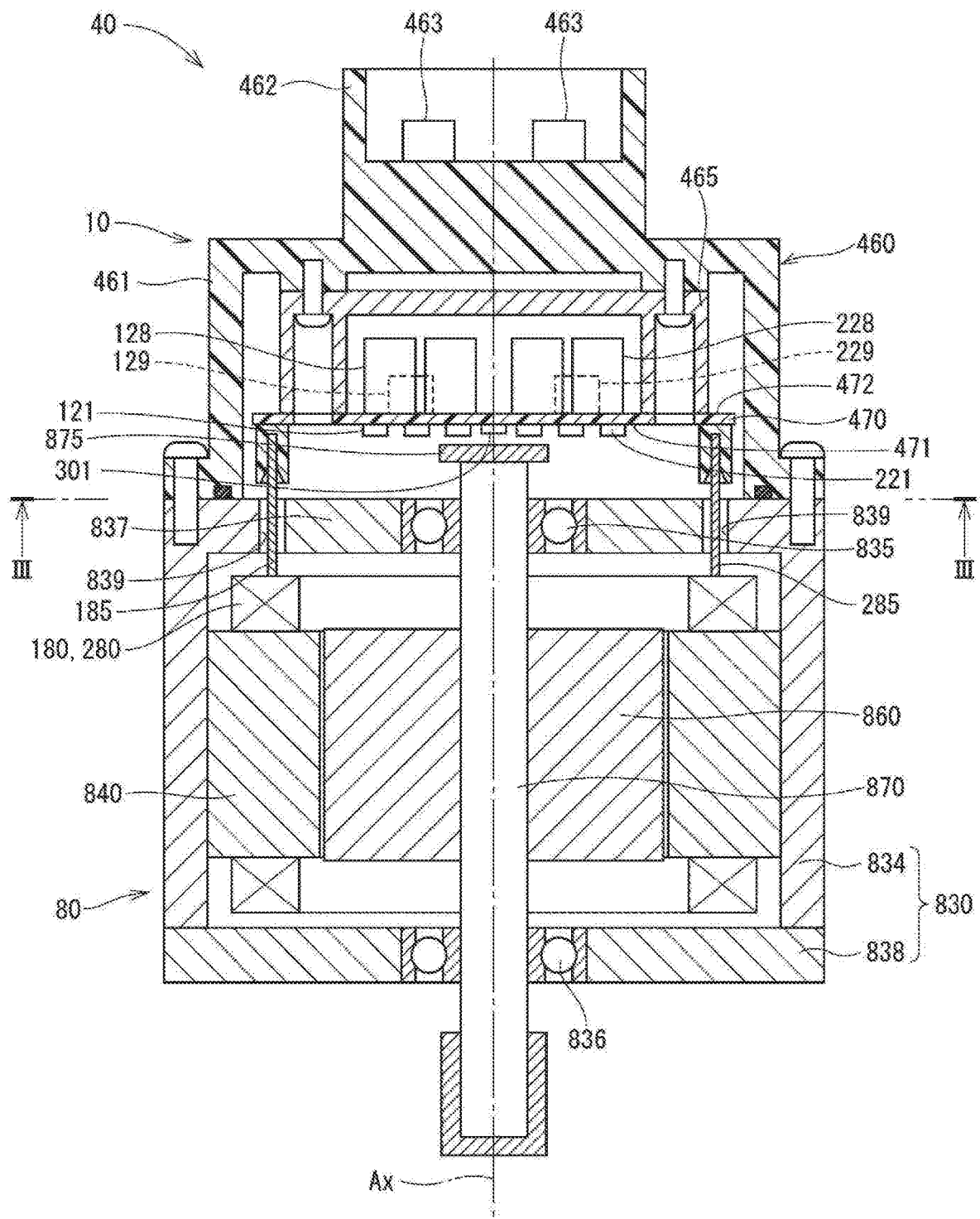
FIG. 2 is a cross sectional view of a driving device according to the first embodiment.
Figure 3:
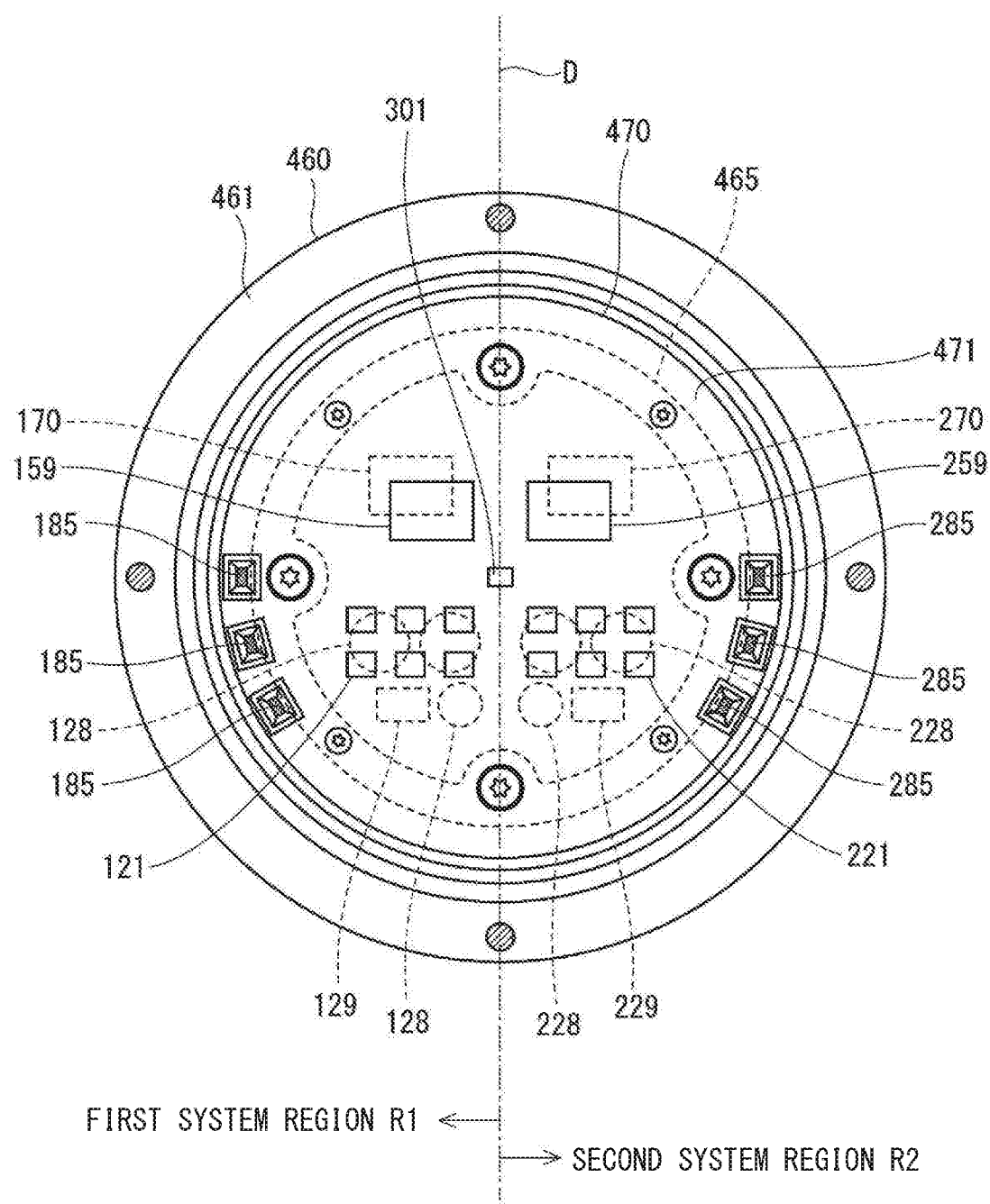
FIG. 3 is a cross sectional view taken along the line III-III of FIG. 2.

As shown in FIG. 2 and FIG. 3, the motor 80 outputs a whole or a part of an assist torque required for a steering operation. The motor 80 is driven with electric power supplied from batteries 191 and 291 (see FIG. 4) to rotate the reduction gear 89 in forward and reverse directions. The motor 80 is a three-phase brushless motor and has a rotor 860 and a stator 840 as shown in FIG. 2.

The motor 80 has a first motor winding 180 and a second motor winding 280 as a winding set. The motor windings 180 and 280 have the same electrical characteristics and are wound about the stator 840 with their electrical angles shifted from each other by 30 degrees. Correspondingly, phase currents are controlled to be supplied to the motor windings 180 and 280 such that the phase currents have a phase difference φ of 30 degrees. By optimizing a current supply phase difference, the output torque is improved. It is also possible to reduce sixth-order torque ripple. Furthermore, it is possible to maximize advantages of cancellation of noise and vibration since the current is averaged by the current supply with phase difference. Heat generation is also averaged. Therefore, it is also possible to reduce temperature-dependent errors in detection values of each sensor or torque between the systems, and it is possible to average a current amount capable of energization.

Hereinafter, a combination of a first driver circuit 120, a first sensor unit 130, a first control unit 170 and the like, which are related to the drive control for the first motor winding 180, is referred to as a first system L1, and a combination of a second driver circuit 220, a second sensor unit 230, a second control unit 270 and the like, which are related to the drive control for the second motor winding 280, is referred to as a second system L2. The configuration related to the first system L1 is basically indicated with reference numerals of 100, and the configuration related to the second system L2 is basically indicated with reference numerals of 200. In the first system L1 and the second system L2, same or similar configuration is indicated with same reference numbers in the least significant two digits. For the other configuration described below, the term "first" is indicated with a suffix "1," and the term "second" is indicated with a suffix "2."

In the driving device 40, the ECU 10 is integrally provided on one side in the axial direction of the motor 80 in a machine-electronics integrated type. The motor 80 and the ECU 10 may alternatively be provided separately. The ECU 10 is positioned coaxially with an axis Ax of the shaft 870 on the side opposite to the output shaft of the motor 80. The ECU 10 may alternatively be provided on the output shaft side of the motor 80. With the electromechanical integrated type, the ECU 10 and the motor 80 can be efficiently placed in a vehicle having a limited mounting space.

The motor 80 includes the stator 840, the rotor 860 and a housing 830 which houses the stator 840 and the rotor 860 therein. The stator 840 is fixed to the housing 830 and the motor windings 180 and 280 are wound thereon. The rotor 860 is provided radially inward of the stator 840 and rotatable relative to the stator 840.

The shaft 870 is fitted firmly in the rotor 860 to rotate integrally with the rotor 860. The shaft 870 is rotatably supported by the housing 830 through bearings 835 and 836. The end portion of the shaft 870 on the ECU 10 side protrudes from the housing 830 toward the ECU 10. A magnet 875 is provided at the axial end of the shaft 870 on the ECU 10 side. A center of the magnet 875 is arranged on the axis Ax. Hereinafter, the axis Ax is referred to as a "detection center" and is appropriately regarded as a "center of the magnet 875". In addition, a position of the axis Ax on the substrate 470 on which the rotation angle sensor 301 is mounted is appropriately regarded as a "detection center".

The housing 830 has a bottomed cylindrical case 834, which has a rear end frame 837, and a front end frame 838 provided on an open side of the case 834. The case 834 and the front end frame 838 are fastened to each other by bolts or the like. Lead wire insertion holes 839 are formed in the rear end frame 837. Lead wires 185 and 285 connected to each phase of the motor windings 180 and 280 are inserted through the lead wire insertion holes 839. The lead wires 185 and 285 are taken out from the lead wire insertion holes 839 to the ECU 10 side and connected to a substrate 470.

The ECU 10 includes a cover 460 and a heat sink 465 fixed to the cover 460 in addition to the substrate 470 fixed to the heat sink 465. The ECU 10 further includes various electronic components and the like mounted on the substrate 470.

The cover 460 protects the electronic components from external impacts and prevents dust, water or the like from entering into the ECU 10. In the cover 460, a cover main body 461 and a connector member 462 are integrally formed. The connector member 462 may alternatively be separated from the cover main body 461. Terminals 463 of the connector member 462 are connected to the substrate 470 via a wiring (not shown) or the like. The number of connectors and the number of terminals may be changed in correspondence to the number of signals and the like. The connector member 462 is provided at the end portion in the axial direction of the driving device 40 and is open on the side opposite to the motor 80. The connector member 462 includes each connector described later.

The substrate 470 is, for example, a printed substrate, and is positioned to face the rear end frame 837. On the substrate 470, the electronic components of the first and second systems are mounted independently for each system so that the two systems are provided in a fully redundant configuration. According to the present embodiment, the electronic components are mounted on one substrate 470. The electronic components may alternatively be mounted on plural substrates.

Of the two principal surfaces of the substrate 470, one surface on the side of the motor 80 is referred to as a motor-side surface 471 and the other surface opposite from the motor 80 is referred to as a cover-side surface 472. As shown in FIG. 3, switching elements 121 configuring a driver circuit 120, switching elements 221 configuring a driver circuit 220, a rotation angle sensor 301 as a detection device, custom ICs 159, 259 and the like are mounted on the motor-side surface 471. The rotation angle sensor 301 is mounted at a portion facing the magnet 875 so as to be able to detect change of magnetic field with rotation of the magnet 875.

The substrate 470 is divided into a first system region R1 and a second system region R2. Electronic components related to the first system L1 are mounted on both surfaces of the first system region R1, and electronic components related to the second system L2 are mounted on both surfaces of the second system region R2. The rotation angle sensor 301 is mounted on a boundary D that divides the first system region R1 and the second system region R2. The boundary line D may be, for example, a portion where a wiring pattern of the substrate 470 is divided, or may be a virtual line. Details of an arrangement relationship between the system regions R1 and R2 and the rotation angle sensor will be described in an embodiment described later.

On the cover-side surface 472, capacitors 128, 228, inductors 129, 229, and microcomputers forming the control units 170, 270 are mounted. In FIG. 3, reference numerals 170 and 270 are assigned to the microcomputers provided as the control units 170 and 270, respectively. The capacitors 128 and 228 smoothen electrical power input from the batteries 191 and 291 (see FIG. 4). The capacitors 128 and 228 assist electric power supply to the motor 80 by storing electric charge therein. The capacitors 128, 228 and the inductors 129, 229 configure filter circuits, respectively, to reduce noises transmitted from other devices which share the batteries 191, 291, and also to reduce noises transmitted to the other devices, which share the batteries 191, 291, from the driving device 40. It is noted that, power supply relays, motor relays, current sensors, etc. (not shown in the drawings) are also mounted on the motor-side surface 471 or on the cover-side surface 472.

Figure 4:
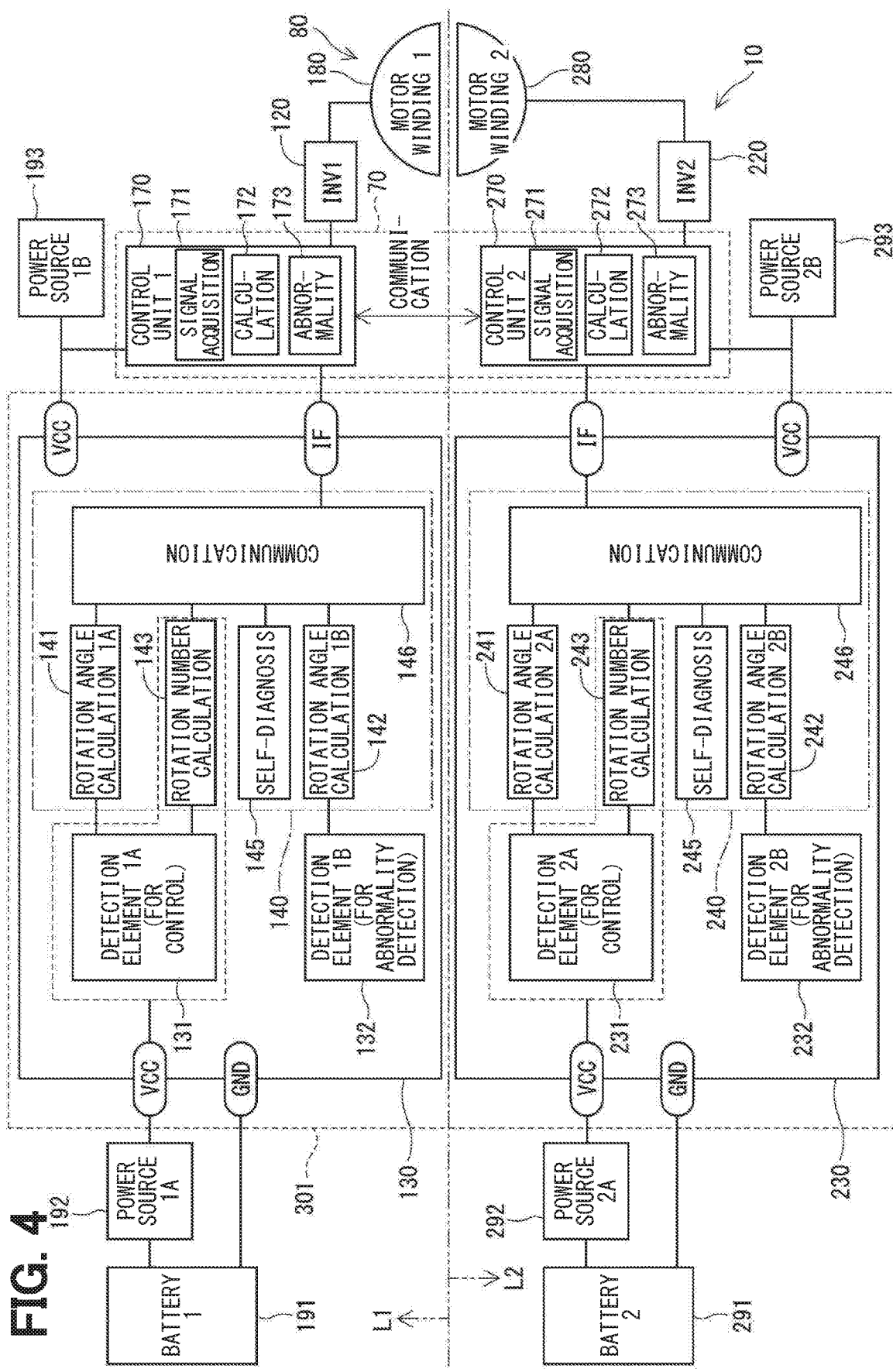
FIG. 4 is a block diagram showing an ECU according to the first embodiment.

As shown in FIG. 4, the ECU 10 includes driver circuits 120 and 220, a calculation device 70, a rotation angle sensor 301, and the like. In FIG. 4, the driver circuit, which is generally an inverter, is described as "INV". The first driver circuit 120 is a three-phase inverter having six switching elements 121, and converts the electric power supplied to the first motor winding 180. The switching elements 121 are controlled to turn on and off based on control signals output from the first control unit 170. The second driver circuit 220 is a three-phase inverter having six switching elements 221, and converts the electric power supplied to the second motor winding 280. The switching elements 221 are controlled to turn on and off based on control signals output from the second control unit 270.

The rotation angle sensor 301 includes the first sensor unit 130 and the second sensor unit 230. The first sensor unit 130 outputs a detection value to the first control unit 170, and the second sensor unit 230 outputs a detection value to the second control unit 270. That is, in the present embodiment, the first sensor unit 130 is included in the first system L1, and the second sensor unit 230 is included in the second system L2. The circuit configuration of the rotation angle sensor is the same in the other embodiments to be described later.

The first sensor unit 130 includes a first main detection element 131, a first sub detection element 132, and a signal processing unit 140. The second sensor unit 230 includes a second main detection element 231, a second sub detection element 232, and a signal processing unit 240. Since the details of the process in the sensor units 130 and 230 are the same, the description of the second sensor unit 230 will be omitted as appropriate.

The detection elements 131, 132, 231, and 232 are detection elements that detect a change in the magnetic field of the magnet 875 according to the rotation of the motor 80. An MR sensor or a Hall IC, for example, is used for the detection elements 131, 132, 231, 232, for example, The signal processing unit 140 includes rotation angle calculation units 141 and 142, a rotation number calculation unit 143, a self-diagnosis unit 145, and a communication unit 146. The signal processing unit 240 includes rotation angle calculation units 241 and 242, a rotation number calculation unit 243, a self-diagnosis unit 245, and a communication unit 246.

The rotation angle calculation unit 141 calculates a rotation angle $\theta 1a$ for control based on a signal from the first main detection element 131. The rotation angle calculation unit 142 calculates a rotation angle $\theta 1b$ for abnormality detection based on a signal from the first sub detection element 132. The rotation angle calculation unit 241 calculates a rotation angle $\theta 2a$ for control based on a signal from the second main detection element 231. The rotation angle calculation unit 242 calculates a rotation angle $\theta 2b$ for abnormality detection based on a signal from the second sub detection element 232.

In the present embodiment, rotation angles $\theta 1a$ and $\theta 2a$ calculated based on the detection signals of the main detection elements 131 and 231 are used for various calculations in the control units 170 and 270. The rotation angles $\theta 1b$ and $\theta 2b$ calculated based on the detection signals of the sub detection elements 132 and 232 are used for abnormality detection by comparison with the rotation angles $\theta 1a$ and $\theta 2a$. Hereinafter, the main detection elements 131 and 231 are referred to as "for control", and the sub detection elements 132 and 232 are referred to as "for abnormality detection". In the present embodiment, the rotation angles $\theta 1a$, $\theta 1b$, $\theta 2a$, and $\theta 2b$ are defined as mechanical angles, but may be defined as electrical angles or may be any values that can be converted into rotation angles in the control units 170 and 270.

The detection elements 131 and 231 for control and the detection elements 132 and 232 for abnormality detection may be of the same type or different types. Since detection accuracy is not required for abnormality detection as compared with that for control, detection accuracy may be lower for abnormality detection than that for control. Using different types of units between for control and for abnormality detection is preferred from the viewpoint of function safety, because both units for abnormality detection and for control rarely break down together, i.e., at the same time. Here, even if the types of elements are the same, elements having different layouts, material ratios, manufacturing lots, and wafer numbers in lots may be regarded as "different types". In addition, not only the elements, but also cases in which the detection circuits connected to the elements, the control circuits, the types or voltages of the supplied power are different may be regarded as "different types". Further, it may also be preferable, from the viewpoint of function safety, to design calculation circuits of the rotation angle calculation units 141 and 142 differently.

The rotation number calculation unit 143 counts the number of rotations TC1 of the motor 80 based on the signal from the detection element 131. The rotation number calculation unit 243 counts the number of rotations TC2 of the motor 80 based on a signal from the detection element 231. The number of rotations TC1 and TC2 can be calculated based on the count value by dividing one rotation of the motor 80 into three or more regions and counting up or down according to the rotation direction each time the region changes. The count value itself is also included in the concept of the number of rotations TC1 and TC2.

The self-diagnosis unit 145 monitors the first sensor unit 130 for an abnormality such as a power short or a ground fault. The communication unit 146 generates a first output signal that is a series of signals including the rotation angles $\theta 1a$ and $\theta 1b$, the number of rotations TC1, the self-diagnosis result, and transmits the first output signal to the first control unit 170. The self-diagnosis unit 245 monitors an abnormality in the second sensor unit 230. The communication unit 246 generates a second output signal, which is a series of signals including the rotation angles $\theta 2a$ and $\theta 2b$, the number of rotations TC2, and the self-diagnosis result, and transmits the second output signal to the second control unit 270. The output signals of the present embodiment are digital signals, and a communication method is, for example, SPI communication, but other communication methods may alternatively be used.

Electric power is supplied from a first battery 191 to the first sensor unit 130 via power sources 192 and 193 which are regulators or the like. Electric power is constantly supplied via the power source 192 to the detection element 131 and the rotation number calculation unit 143 surrounded by broken lines while a start switch of the vehicle such as an ignition switch or the like is turned off, and detection and calculation are continuable during such time. In the first sensor unit 130, power is supplied to the components other than the detection element 131 and the rotation number calculation unit 143 via the power source 193 when the start switch is turned on, and the power is stopped when the start switch is turned off. Also, electric power is supplied to the first control unit 170 via the power source 193 when the start switch is turned on.

Electric power is supplied to the second sensor unit 230 from the second battery 291 via power sources 292 and 293 which are regulators or the like. The detection unit 231 and the rotation number calculation unit 243 surrounded by broken lines are constantly supplied with electric power via the power source 192 while the start switch is turned off, and detection and calculation are continuable during such time. In the second sensor unit 230, power is supplied to the components other than the detection element 231 and the rotation number calculation unit 243 via the power source 293 when the start switch is turned on, and stopped when the start switch is turned off. Is done. Also, electric power is supplied to the second control unit 270 via the power source 293 when the start switch is turned on.

It is desirable to select elements of low power consumption, such as a TMR element, for example, for the detection elements 131 and 231 to which the electric power is continuously supplied. In order to avoid complication, descriptions of some wires and control lines such as the connection line between the battery 191 and the power source 193 are omitted. In FIG. 4, reference numeral "1A" is attached to the detection element 131, the rotation angle calculation unit 141 and the power source 192, and reference numeral "1B"

is attached to the detection element 132, the rotation angle calculation unit 142 and the power source 193. Reference numeral "2A" is attached to the detection element 231, the rotation angle calculation unit 241 and the power source 292, and reference numeral "2B" is attached to the detection element 232, the rotation angle calculation unit 242, and the power source 293.

The calculation device 70 includes a first control unit 170 and a second control unit 270. Each of the control units 170 and 270 is mainly composed of a microcomputer and the like, and internally includes, although not shown in the figure, a CPU, a ROM, a RAM, an I/O, a bus line for connecting these components, and the like. Processing executed by each of the control units 170 and 270 may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit.

The first control unit 170 and the second control unit 270 are provided to be communicable with each other. Hereinafter, the communication between the control units 170 and 270 may be referred to as inter-computer communication. As a communication method between the control units 170 and 270, any method such as serial communication like SPI or SENT, CAN communication, FlexRay communication or the like may be employed.

The first control unit 170 has a signal acquisition unit 171, a calculation unit 172, and an abnormality determination unit 173. The signal acquisition unit 171 acquires a first output signal from the first sensor unit 130. The calculation unit 172 calculates a steering angle θs1 using the rotation angle θ1a and the number of rotations TC1. The calculation unit 172 generates a control signal for controlling the on/off operation of the switching element 121 of the driver circuit 120 by, for example, current feedback control based on the rotation angle θ1a and a detection value of a current sensor (not shown). The abnormality determination unit 173 detects an abnormality of the first sensor unit 130 by comparing the rotation angles θ1a and θ1b. In the present embodiment, when the difference between the rotation angles θ1a and θ1b is larger than the abnormality determination threshold, it is determined that the rotation angle is abnormal.

The second control unit 270 includes a signal acquisition unit 271, a calculation unit 272, and an abnormality determination unit 273. The signal acquisition unit 271 acquires a second output signal from the second sensor unit 230. The calculation unit 272 calculates the steering angle θs2 using the rotation angle θ2a and the number of rotations TC2. In addition, the calculation unit 272 generates a control signal for controlling the on/off operation of the switching element 221 of the driver circuit 220 by, for example, current feedback control based on the rotation angle θ2a and a detection value of a current sensor (not shown). The switching elements 121 and 221 are turned on and off based on the control signal so as to control the energization of the motor windings 180 and 280, and the driving of the motor 80 is controlled. The abnormality determination unit 273 detects an abnormality of the second sensor unit 230 by comparing the rotation angles θ2a and θ2b. In the present embodiment, when the difference between the rotation angles θ2a and θ2b is larger than the abnormality determination threshold, it is determined that the rotation is abnormal.

In the present embodiment, the counting of the number of rotations TC1 and TC2 is continued even if the start switch is turned off. Therefore, after the start switch is turned on again, for example, the steering angles θs1 and θs2 can be calculated immediately after the start without performing re-learning in a straight traveling state of the vehicle. Further, in the sensor units 130 and 230, the configuration for constantly supplying power is limited to the minimum configuration necessary for continuing the calculation of the number of rotations TC1 and TC2. Therefore, power consumption during the start switch-off can be suppressed.

In the present embodiment, the rotation number calculation units 143 and 243 calculate the number of rotations TC1 and TC2 using the detection values of the detection elements 131 and 231 for control. As a result, the control rotation angle θ1a and the number of rotations TC1 do not cause any deviation due to the detection characteristics of the elements or the mounting deviation, so that the steering angle θs1 can be appropriately calculated. The same applies to the steering angle θs2.

Figure 5:
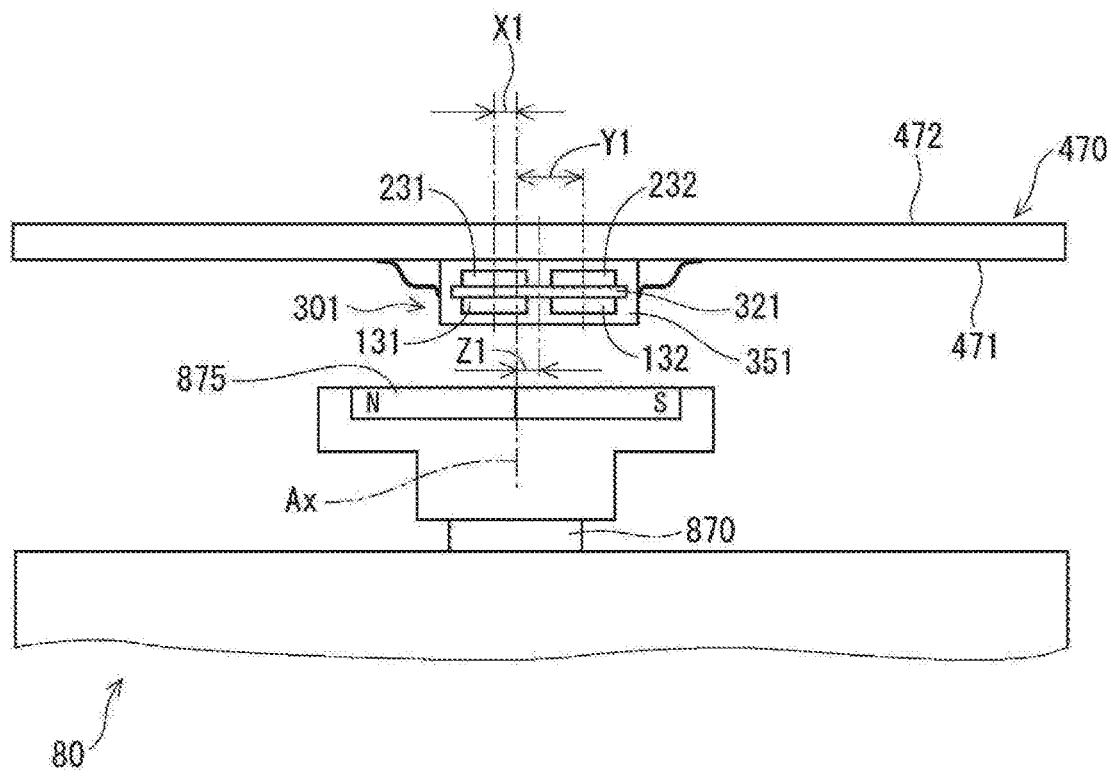
FIG. 5 is a schematic diagram showing a rotation angle sensor and a magnet according to the first embodiment.
Figure 6:
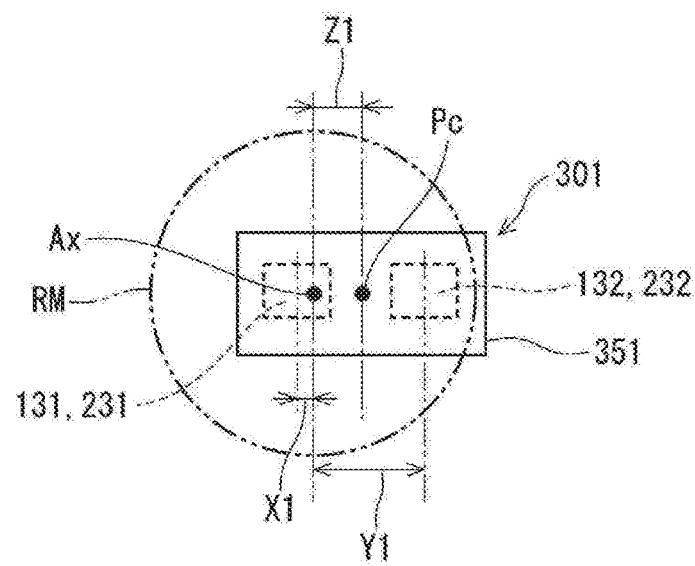
FIG. 6 is a plan view showing the rotation angle sensor according to the first embodiment.

The arrangement of the detection elements 131, 132, 231, and 232 is shown in FIGS. 5 and 6. FIG. 5 and the like are schematic views showing cross sections, but hatching is omitted to avoid complication. As shown in FIGS. 5 and 6, the detection elements 131, 132, 231, and 232 are mounted on a lead frame 321 and sealed with a package 351. The package 351 is mounted on a motor-side surface 471 of the substrate 470 so as to include the axis Ax in the mounting area. The arithmetic circuit elements constituting the signal processing units 140 and 240 may be provided at any position in the package 351, but are provided between the corresponding detection elements 131, 132, 231, 232 and the lead frame 321, for example.

The detection elements 131 and 132 of the first system L1 are mounted on the surface of the lead frame 321 that faces the magnet 875. The detection elements 231 and 232 of the second system L2 are mounted on the surface of the lead frame 321 on the substrate 470 side. The detection elements 131 and 132 of the first system L1 may be on the substrate side, and the detection elements 231 and 232 of the second system L2 may be on the side facing the magnet 875. The gap distance, which is the distance between the package 351 and the magnet 875 in the axial direction of the motor 80 (that is, the vertical direction on the paper surface of FIG. 5), is set so that the detection elements 131, 132, 231, 232 are arranged in an optimum gap region.

In the present embodiment, all the detection elements 131, 132, 231, 232 are arranged in the region RM in which the magnetic field can be detected with relatively high accuracy. In the present embodiment, the area RM is a projection area in the axial direction of the magnet 875. In the present embodiment, the rotation angle sensor 301 has a smaller physical size than that of the magnet 875. The region RM may be a virtual region that is not coincident with the projection region of the magnet 875 and that is defined by magnetic force lines or the like, depending on the characteristics and shape of the magnet 875. The detection elements 131 and 231 are respectively arranged on both sides of the lead frame 321 at the same position with the lead frame 321 interposed therebetween. The distance X1 between the center of the detection elements 131 and 231 and the axis Ax is equal. The detection elements 132 and 232 are arranged on both surfaces of the lead frame 321 at the same position with the lead frame 321 interposed therebetween, and the distance Y1 between the detection elements 132 and 232 and the axis Ax is equal.

The main detection elements 131 and 231 and the sub detection elements 132 and 232 are arranged symmetrically with respect to the center Pc of the package 351. Further, the center Pc of the package 351 is arranged so as to deviate from the axis Ax. That is, if the distance between the center of the package 351 and the axis Ax is Z1, then Z1≠0.

In the present embodiment, the centers of all the detection elements 131, 132, 231, 232 are arranged so as to be displaced from the axis line Ax. Further, the detection elements 131 and 231 used for control are arranged close to the axis Ax so that the detection accuracy of the detection elements 131 and 231 can be ensured. The distance X1 between the center of the detection elements 131 and 231 for control and the axis Ax is smaller than the distance Y1 between the detection elements 132 and 232 for abnormality detection and the axis Ax. That is, X1 is smaller than Y1 (X1<Y1).

In the present embodiment, the detection element 131 and the detection element 132 are arranged separately. If the distance between the sensors is small and the sensors are arranged, for example, adjacently, it is difficult to manufacture in a manufacturing process. Therefore, in the present embodiment, the axes Ax are arranged closer to the main detection element 131 side than the centers of the detection elements 131 and 132 while separating the detection elements 131 and 132. Therefore, manufacturing is easy, and the detection elements 131 and 132 can be relatively close to the axis Ax, and the detection accuracy required for the detection elements 131 and 132 can be satisfied. The same applies to the detection elements 231 and 232.

In the arrangement of the magnet 875 and the respective parts of the rotation angle sensors 301 to 312, if attention is paid only to the "distance", the distance is on the same plane perpendicular to the axis Ax of the motor 80. Further, as described above, the axial distance of the motor 80 is the "gap distance". "Equal distance" means that a deviation of about manufacturing error is allowed. The same applies to "same location", "parallel", and the like.

Figure 7:
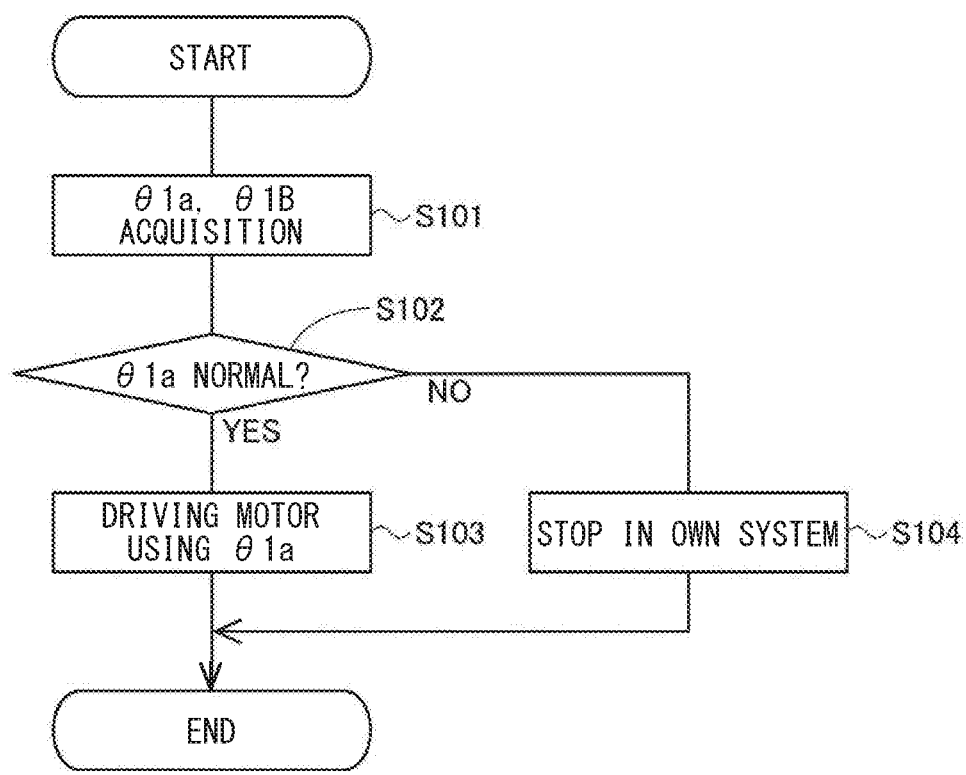
FIG. 7 is a flowchart illustrating a motor control process according to the first embodiment.

The motor control process of the present embodiment will be described based on the flowchart of FIG. 7. Here, the process in the second control unit 270 is the same as the process in the first control unit 170, if the value to be used is the value of the second sensor unit 230, and thus the description relating to the process of the second control unit 270 is omitted. Hereinafter, "step" in step S101 is omitted, and is simply referred to as a symbol "S." The same applies to the other steps.

In S101, the first control unit 170 acquires the rotation angles θ1a and θ1b from the first sensor unit 130. In S102, the abnormality determination unit 173 determines whether or not the control rotation angle θ1a is normal. Here, the rotation angles θ1a and θ1b are compared, and if the difference is larger than the abnormality determination threshold value, it is determined to be abnormal. The abnormality determination is also performed when the diagnosis result of the self-diagnosis unit 145 of the first sensor unit 130 is abnormal. When it is determined that the control rotation angle θ1a is normal (S102: YES), the process proceeds to S103. When it is determined that the control rotation angle θ1b is not normal (S102: NO), the process proceeds to S104. To do.

In S103, the first control unit 170 controls the driving of the motor 80 using the control rotation angle θ1a. Specifically, the calculation unit 172 uses the rotation angle θ1a for control to generate a control signal for controlling the on/off operation of the switching element 121. In S104, the first control unit 170 stops the drive control of the motor 80 in its own system. If the rotation angle θ2a output from the second sensor unit 230 is normal, the drive of the motor 80 is continued by the single system drive in the second system L2. Further, the control rotation angle θ2a may be acquired from the second control unit 270 by communication between the microcomputers, and the control by the first control unit 170 may be continued based on the control rotation angle θ2a.

In the present embodiment, the rotation angle sensor 301 has two detection elements 131 and 231 for control. Therefore, even when one of the detection elements 131 and 231 is abnormal, the control can be continued by using other element. Since the detection elements 131 and 231 for control are both arranged close to the center of the magnet 875, the rotation of the motor 80 can be detected with high accuracy. Further, since the rotation angle sensor 301 is provided with the detection elements 132 and 232 for abnormality detection with respect to the detection elements 131 and 231 for control, respectively, independent control in a complete two-system configuration can be performed.

Further, in the present embodiment, the detection elements 131, 132, 231, 232 are mounted on both surfaces of the lead frame 321, and are packaged into one package, and are mounted on the motor-side surface 471 of the substrate 470. Therefore, the area occupied by the substrate 470 can be reduced. Further, since the rotation angle sensor 301 can be arranged close to the magnet 875, the magnet 875 can be downsized.

As described above, the rotation angle sensor 301 includes the main detection elements 131 and 231, the sub detection elements 132 and 232, the signal processing units 140 and 240, and the package 351.

The main detection elements 131 and 231 detect a rotating magnetic field that changes according to the rotation of the magnet 875. The main detection elements 131 and 231 detect a rotating magnetic field that changes according to the rotation of the magnet 875. The sub detection elements 132 and 232 detect a rotating magnetic field that changes according to the rotation of the magnet 875. The signal processing units 140 and 240 output rotation angles θ1a and θ2a, which are information corresponding to the detection values of the main detection elements 131 and 231, and rotation angles θ1b and θ2b, which are information corresponding to the detection values of the sub detection elements 132 and 232. The package 351 seals the detection elements 131, 132, 231, 232 and the signal processing units 140, 240.

The centers of all the detection elements 131, 132, 231, 232 are arranged at positions displaced from the axis Ax that is the rotation center of the magnet 875. The main detection elements 131 and 231 are arranged closer to the axis Ax than the sub detection elements 132 and 232. The package 351 is arranged at a position where its center is displaced from the axis Ax. The axis Ax is located in the package area. Further, the detection value of the main detection element is used for control calculation, and the detection value of the sub detection element is used for abnormality detection of the main detection element.

As a result, even if the number of detection elements for the redundant system increases, the detection accuracy of the main detection elements 131 and 231 can be ensured while suppressing the size increase of the magnet 875. Further, since the sub detection elements 132 and 232 can also be arranged at locations with relatively high detection accuracy, the magnet 875 can be downsized.

The package 351 is arranged at a position where the center Pc is displaced from the axis Ax. Accordingly, even when the main detection elements 131 and 231 and the sub detection elements 132 and 232 are symmetrically arranged in the package 351, the center Pc of the package 351 is shifted from the axis Ax to detect the main detection.

Therefore, the detection elements 131 and 231 can be properly aligned with the axis Ax.

In the present embodiment, the main detection element includes the first main detection element 131 and the second main detection element 231, and the sub detection element includes the first sub detection element 132 and the second sub detection element 232. The first main detection element 131 and the first sub detection element 132 are mounted on one surface of the lead frame 322, and the second main detection element 231 and the second sub detection element 232 are mounted on the other surface of the lead frame 322.

Two main detection elements 131 and 231 are provided in one package 351, and are mounted at the same location on both surfaces of the lead frame 321 provided in the package 351. This configuration makes it possible to equalize the amount of axis deviation of the main detection elements 131 and 231 from the detection center, and to achieve the same detection accuracy. By mounting the main detection elements 131 and 231 on both sides of the lead frame 321, the rotation angle sensor 301 can be downsized.

The main detection elements 131 and 231 and the sub detection elements 132 and 232 may have different configurations relating to element. As a result, occurrence of an abnormality due to the same cause can be suppressed, and functional safety can be improved. The "configuration relating to element" means that the type of element is different (for example, a TMR element, an AMR element, a Hall element, etc.), the internal configuration of the element is different (for example, the wafer is different, the layout is different, the material is different, the manufacturing conditions are different, the manufacturing lot is different, etc.), the circuit configuration connected to the elements is different, or the type and voltage of the power supply supplied to the elements are different.

The calculation device 70 includes signal acquisition units 171, 271, calculation units 172, 272, and abnormality determination units 173, 273. The signal acquisition units 171 and 271 acquires the rotation angles $\theta1b$ and $\theta2b$ according to detection values of the sub detection elements 132 and 232, which are arranged at positions deviated from the axis Ax that is the rotation center of the magnet 875, and the rotation angles $\theta1a$ and $\theta2a$ corresponding to the detection values of the main detection elements 131 and 231 that are arranged at positions deviated from the axis Ax that is the rotation center of the magnet 875, and are located closer to the axis Ax than the sub detection elements 132 and 232. The calculation units 172 and 272 perform control calculation based on the rotation angles $\theta1a$ and $\theta2a$. The abnormality determination units 173 and 273 determine an abnormality based on the rotation angles $\theta1a$ and $\theta2a$ and the rotation angles $\theta1b$ and $\theta2b$.

The ECU 10 includes the rotation angle sensor 301 and the calculation device 70. The rotation angle sensor 301 includes main detection elements 131 and 231, sub detection elements 132 and 232, and signal processing units 140 and 240. The main detection elements 131 and 231 detect a rotating magnetic field that changes according to the rotation of the magnet 875. The main detection elements 131 and 231 detect a rotating magnetic field that changes according to the rotation of the magnet 875. The sub detection elements 132 and 232 detect a rotating magnetic field that changes according to the rotation of the magnet 875. The signal processing units 140 and 240 output rotation angles $\theta1a$ and $\theta2a$, which are information corresponding to the detection values of the main detection elements 131 and 231, and rotation angles $\theta1b$ and $\theta2b$, which are information corresponding to the detection values of the sub detection elements 132 and 232, to the calculation device 70. The centers of all the detection elements 131, 132, 231, 232 are arranged at positions displaced from the axis Ax that is the rotation center of the magnet 875. The main detection elements 131 and 231 are arranged closer to the axis Ax than the sub detection elements 132 and 232.

The calculation device 70 includes control units 170 and 270 including signal acquisition units 171, 271, calculation units 172 and 272, and abnormality determination units 173 and 273. The signal acquisition unit 171 acquires the rotation angle $\theta1a$ and the rotation angle $\theta1b$ from the rotation angle sensor 301. The signal acquisition unit 271 acquires the rotation angle $\theta2a$ and the rotation angle $\theta1b$ from the rotation angle sensor 301. The calculation units 172 and 272 perform control calculation using the rotation angles $\theta1a$ and $\theta2a$. The abnormality determination units 173 and 273 determine the abnormality of the rotation angle sensor 301 based on the rotation angles $\theta1a$ and $\theta2a$ and the rotation angles $\theta1b$ and $\theta2b$.

Since the main detection elements 131 and 231 are arranged at locations with relatively high detection accuracy, the calculation units 172 and 272 can appropriately perform control calculation based on the rotation angles $\theta1a$ and $\theta2a$. Further, the abnormality determination can be appropriately performed based on the rotation angles $\theta1a$ and $\theta2a$ and the rotation angles $\theta1b$ and $\theta2b$.

The calculation device 70 has a plurality of control units 170 and 270. The combination of the detection elements 131 and 132 and the signal processing unit 140 is referred to as the first sensor unit 130, and the combination of the detection elements 231 and 232 and the signal processing unit 240 is referred to as the second sensor unit 230. The sensor units 130 and 230 are provided corresponding to the control units 170 and 270, respectively.

The calculation unit 172 performs the control calculation based on the rotation angle $\theta1a$ acquired from the corresponding first sensor unit 130, and when the rotation angle $\theta1a$ is abnormal, the calculation unit 172 stops the control calculation. When the rotation angle $\theta2a$ that is "other main rotation information" is normal, the control by the second control unit 270 that has acquired the normal rotation angle $\theta2a$ is continued.

The calculation unit 272 performs the control calculation based on the rotation angle $\theta2a$ acquired from the corresponding second sensor unit 230. When the rotation angle $\theta2a$ is abnormal, the calculation unit 272 stops the control calculation. When the rotation angle $\theta1a$ that is "other main rotation information" is normal, the control by the first control unit 170 that has acquired the normal rotation angle $\theta1a$ is continued. As a result, even if one of the rotation angles $\theta1a$ and $\theta1b$ is abnormal, the control can be appropriately continued.

The combination of the sensor units 130 and 230 provided corresponding to the control units 170 and 270 and the control units 170 and 270 is referred to as a system, and electric power is supplied from separate batteries 191 and 291 for each system. As a result, even when the power supply to some systems is abnormal, the control using the other systems can be appropriately continued.

The detection elements 131, 132, 231, 232 detect a rotating magnetic field that changes according to the rotation of the motor 80. The control units 170 and 270 control the drive of the motor 80 based on the rotation angles $\theta1a$ and $\theta2a$. Thereby, the drive of the motor 80 can be controlled appropriately.

The electric power steering device 8 includes the ECU 10 and the motor 80. By controlling the drive of the motor 80 based on the rotation angle θ1a and θ2a, the electric power steering device 8 can be appropriately controlled.

The detection elements 131 and 231 continue detection even while the start switch of the vehicle is off. The signal processing units 140 and 240 continue to calculate the number of rotations TC1 and TC2 of the motor 80 while the start switch is off. Accordingly, even if the steering sensor for detecting the steering angle is not provided, it is not necessary to relearn the neutral position, and the steering angles θs1 and θs2 can be appropriately calculated immediately after the start.

Second Embodiment

Figure 8:
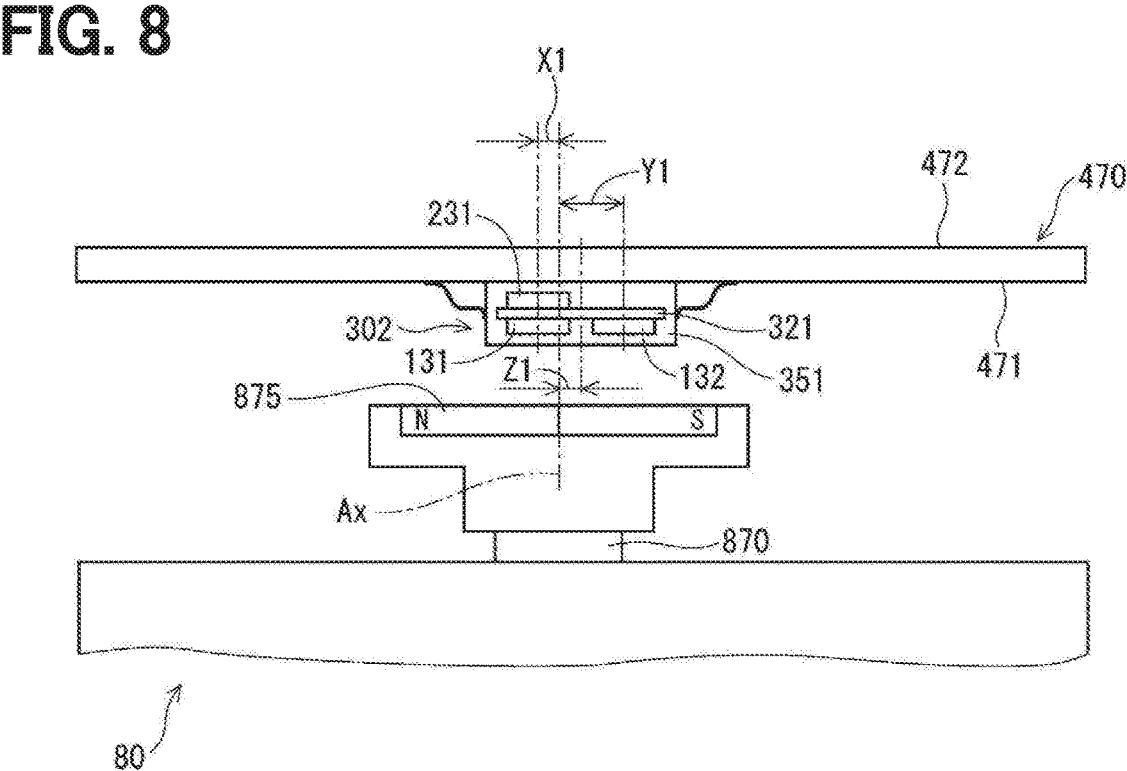
FIG. 8 is a schematic diagram showing a rotation angle sensor and a magnet according to a second embodiment.

A second embodiment is shown in FIG. 8. The rotation angle sensor 302 of the present embodiment is the same as that of the above embodiment, except that the detection element 132 for abnormality detection and the rotation angle calculation unit 242 (not shown in FIG. 8) are omitted. The rotation angle θ1b for abnormality detection is shared by two systems, for example, using communication between microcomputers. The above configuration can reduce the number of detection elements. Thus, effects similarly to those of the embodiments described above will be produced.

Third Embodiment

Figure 9:
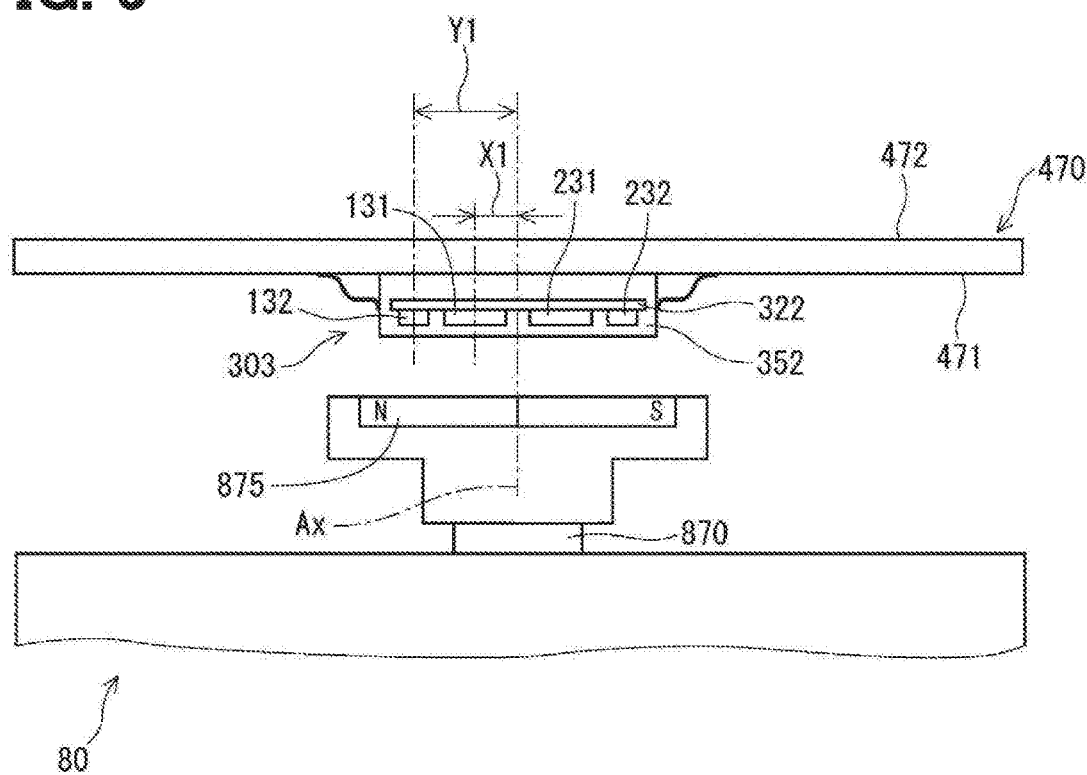
FIG. 9 is a schematic diagram showing a rotation angle sensor and a magnet according to a third embodiment.
Figure 10:
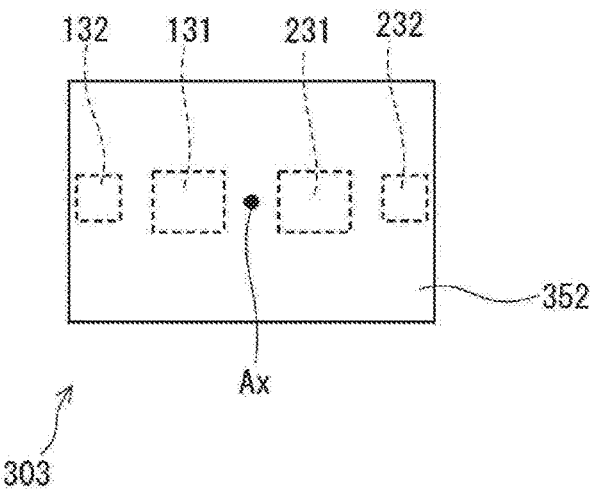
FIG. 10 is a plan view showing the rotation angle sensor according to the third embodiment.

The third embodiment is shown in FIGS. 9 and 10. The rotation angle sensor 303 of the present embodiment has detection elements 131, 132, 231, 232, a lead frame 322, and a package 352. The center of the package 352 is arranged at a position that coincides with the axis Ax.

The detection elements 131, 132, 231, 232 are all arranged side by side on the surface of the lead frame 322 facing the magnet 875. The detection elements 131 and 231 for control are arranged on both sides of the magnet 875. The detection elements 132 and 232 for abnormality detection are arranged outside the detection elements 131 and 231 for control.

In this embodiment, all the main detection elements 131 and 231, and the sub detection elements 132 and 232 are mounted on one surface of the lead frame 322, specifically, the surface on the magnet 875 side. By disposing the main detection elements 131 and 231 closer to the axis line Ax than the sub detection elements 132 and 232, detection accuracy is ensured. Moreover, since the detection elements are mounted on one side, productivity can be improved as compared with the case where the detection elements are mounted on both sides. Thus, effects similarly to those of the embodiments described above will be produced.

Fourth Embodiment

Figure 11:
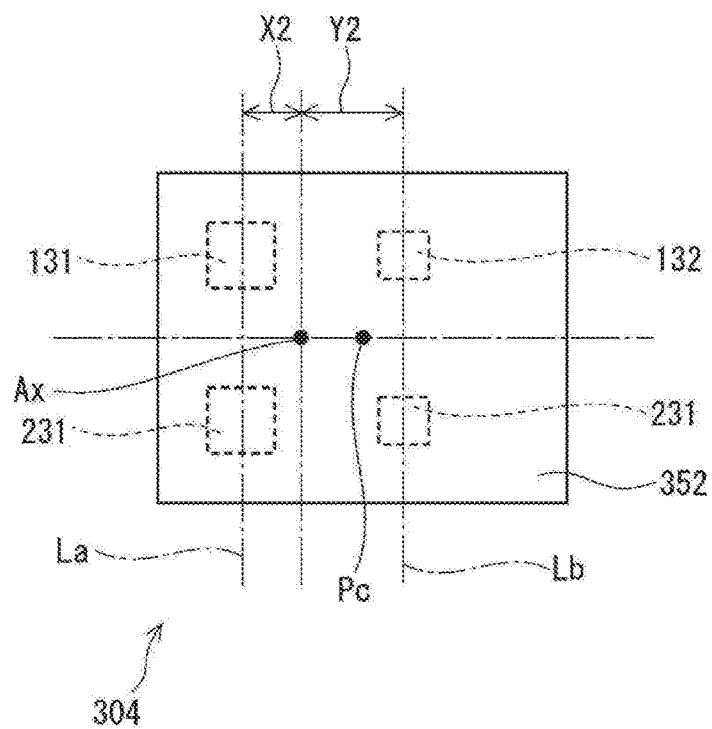
FIG. 11 is a plan view showing a rotation angle sensor according to a fourth embodiment.

The fourth embodiment is shown in FIG. 11. In the rotation angle sensor 304 of the present embodiment, the main detection elements 131 and 231 and the sub detection elements 132 and 232 are arranged on both sides of the axis Ax. A straight line La connecting the centers of the main detection elements 131 and 231 and a straight line Lb connecting the centers of the sub detection elements 132 and 232 are arranged so as to be parallel to each other. A distance X2 between the straight line La and the axis Ax is smaller than a distance Y2 between the straight line Lb and the axis Ax. Further, the center of the package 352 is arranged so as to be displaced from the axis Ax.

In the present embodiment, the detection elements 131 and 231 for control are arranged closer to the axis Ax with respect to the detection elements 132 and 232 for abnormality detection. Therefore, the detection accuracy can be secured. Thus, effects similarly to those of the embodiments described above will be produced.

Fifth Embodiment

Figure 12:
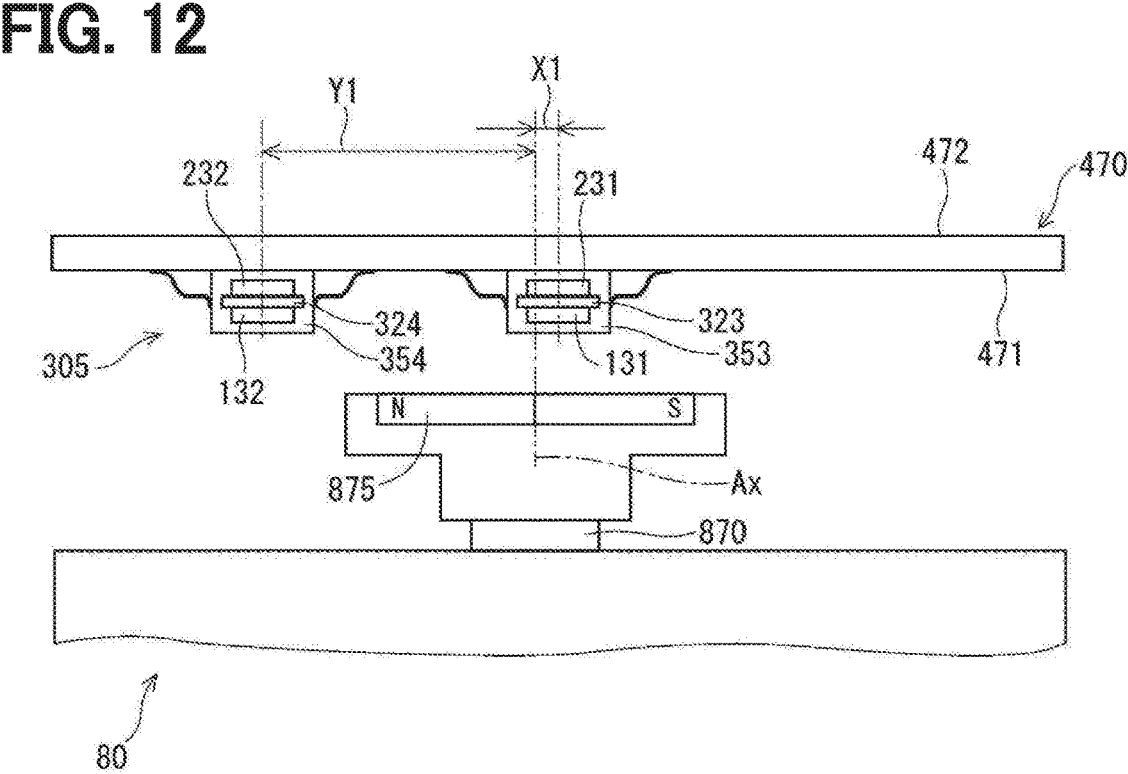
FIG. 12 is a schematic diagram showing a rotation angle sensor and a magnet according to a fifth embodiment.

The fifth embodiment is shown in FIG. 12. The rotation angle sensor 305 of the present embodiment has a main package 353 including main detection elements 131 and 231 and a sub package 354 including sub detection elements 132 and 232. In the package 353, the detection element 131 is mounted on the surface of the lead frame 323 facing the magnet 87, and the detection element 231 is mounted on the surface of the substrate 470 side. The detection elements 131 and 231 are mounted at the same location on both surfaces of the lead frame 323. In the package 354, the detection element 132 is mounted on the surface of the lead frame 324 facing the motor 80, and the detection element 232 is mounted on the surface facing the substrate 470. That is, the detection elements 132 and 232 are mounted at the same location on both surfaces of the lead frame 324.

In the present embodiment, the center of the package 353 is displaced from the axis Ax to the one side. The center of the package 354 is arranged so as to be displaced from the axis Ax to the other side. Further, as in the above embodiment, the distance X1 between the detection elements 131 for control and 231 and the axis Ax is smaller than the distance Y1 between the elements 132 and 232 for abnormality detection and the axis Ax. That is, X1 is smaller than Y1 (X1<Y1). The packages 353 and 354 are arranged such that the centers of the packages 353 and 354 are on both sides of the axis Ax, and X1 becomes to be smaller than Y1 (X1<Y1). Therefore, while ensuring the detection accuracy of the main detection elements 131 and 231, it is possible to arrange the sub detection elements 132 and 232 in a region where the detection accuracy is relatively good.

In the present embodiment, the package includes a main package 353 that seals the main detection elements 131 and 231 and a sub package 354 that seals the sub detection elements 132 and 232, and the sub package is arranged at a position farther from the axis Ax with respect to the main package. In the case of one package, if overheating occurs due to a failure of some of the components in one package, propagation of heat from one component may cause other normal components to fail simultaneously. By dividing the package into a plurality of packages as in the present embodiment, it is possible to suppress simultaneous failures due to heat propagation. Thus, effects similarly to those of the embodiments described above will be produced.

Sixth Embodiment

Figure 13:
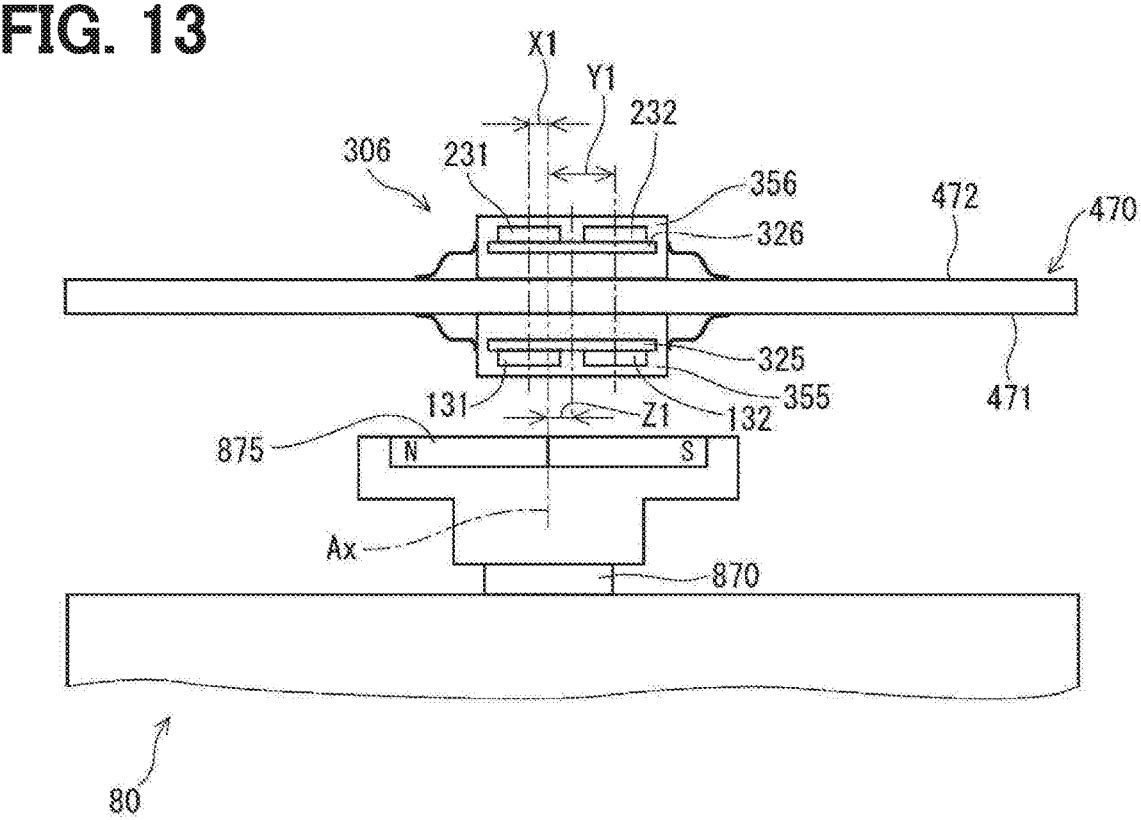
FIG. 13 is a schematic diagram showing a rotation angle sensor and a magnet according to a sixth embodiment.

The sixth embodiment is shown in FIG. 13. The rotation angle sensor 306 of the present embodiment has a package 355 including the detection elements 131 and 132 of the first system L1 and a package 356 including the detection elements 231 and 232 of the second system L2. The package 355 is mounted on the motor-side surface 471 of the substrate 470, and the package 356 is mounted on the cover-side surface 472 of the substrate 470.

In the package 355, the detection elements 131 and 132 are mounted on the surface of the lead frame 325 opposite to the substrate 470. In the package 356, the detection elements 231 and 232 are mounted on the surface of the lead frame 326 opposite to the substrate 470. The centers of the packages 354 and 355 are arranged so as to be offset from the axis Ax. That is, Z1 is not 0 (Z1≠0).

The main detection elements 131 and 231 are arranged on the front and back sides of the substrate 470 at corresponding positions with the substrate 470 interposed therebetween. Further, the distance X1 between each main detection element 131, 132 and the axis Ax is equal. The sub detection elements 132 and 232 are arranged on the front and back sides of the substrate 470 at corresponding positions with the substrate 470 interposed therebetween, and the distance Y1 between each sub detection element 132, 232 and the axis Ax is equal. In the present embodiment, as in the first embodiment, the main detection elements 131 and 231 are arranged closer to the axis Ax with respect to the sub detection elements 132 and 232. That is, X1 is smaller than Y1 (X1<Y1).

In the present embodiment, two main detection elements 131 and 231 are provided. The packages 355 and 356 are provided for each of the main detection elements 131 and 231. The main detection elements 131 and 231 are provided on the front and back sides of the substrate 470 so that the detection elements 131 and 231 are arranged at the same position with the substrate 470 interposed therebetween. The same effects as those of the above embodiments can be obtained even in the configuration described above.

Seventh Embodiment

Figure 14:
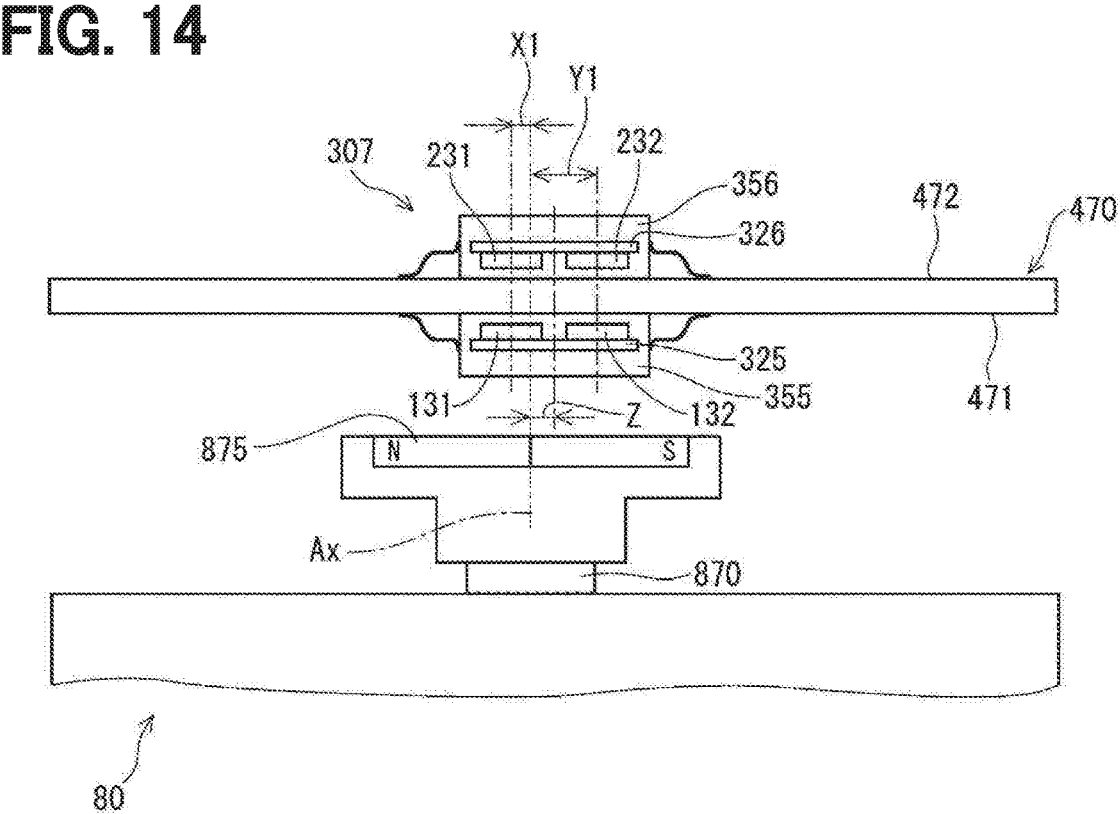
FIG. 14 is a schematic diagram showing a rotation angle sensor and a magnet according to a seventh embodiment.

The seventh embodiment is shown in FIG. 14. In the rotation angle sensor 307 of the present embodiment, the detection elements 131, 132, 231, 232 are mounted on the substrate 470 side of the lead frames 325, 326. The above configuration is different from the sixth embodiment. In the present embodiment, as compared with the sixth embodiment, the detection elements 131 and 231 can be arranged close to each other, so that the detection error can be reduced. Further, when the distance between the detection elements 131 and 231 is the optimum gap distance, the substrate 470 and the magnet 875 can be brought close to each other, so that the magnet 875 can be downsized. Thus, effects similarly to those of the embodiments described above will be produced.

Eighth Embodiment

Figure 15:
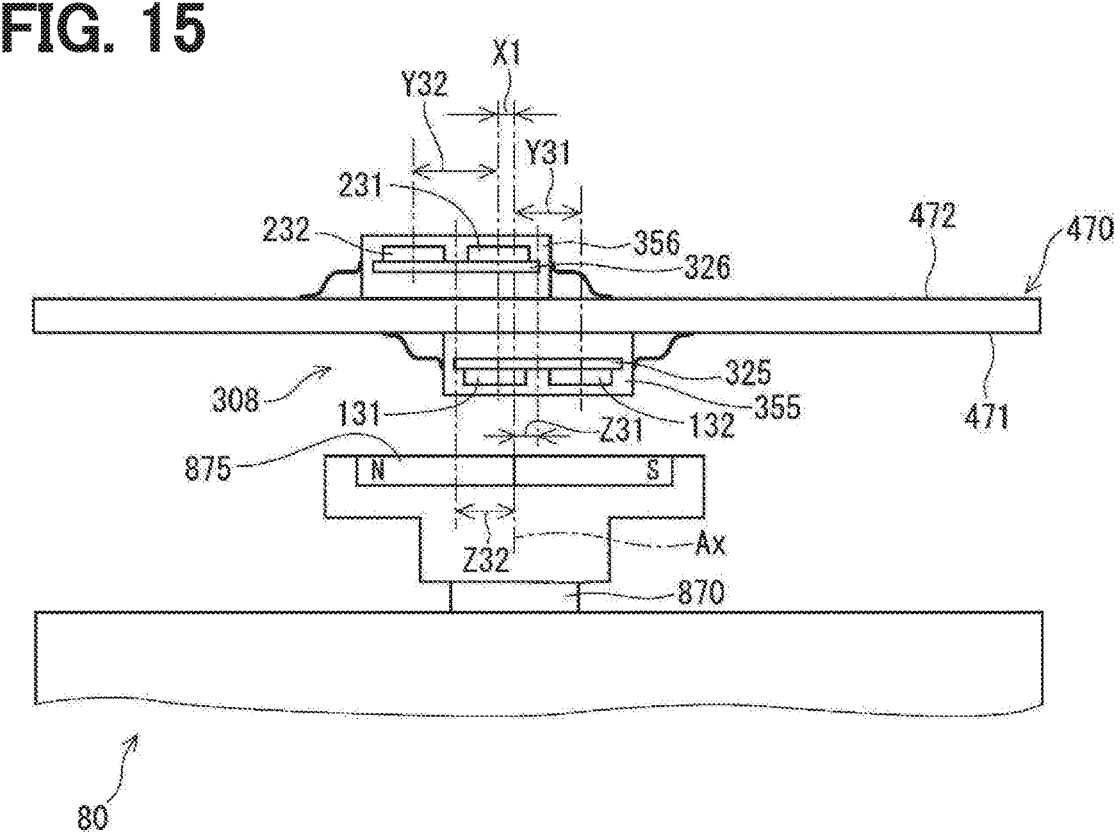
FIG. 15 is a schematic diagram showing a rotation angle sensor and a magnet according to an eighth embodiment.

The eighth embodiment is shown in FIG. 15. In the rotation angle sensor 308 of the present embodiment, the detection elements 131, 132, 231, 232 are mounted on the opposite side of the lead frames 324, 325 with respect to the substrate 470 as in the sixth embodiment. However, the detection elements 131, 132, 231, 232 are mounted on the substrate 470 side as in the seventh embodiment. Further, the main detection elements 131 and 231 are arranged on the front and back sides of the substrate 470 at corresponding positions with the substrate 470 interposed therebetween, and the distance X1 between the main detection element 131 and the axis Ax is equal to the distance X1 between the main detection element 231 and the axis Ax.

The sub detection elements 132 and 232 are arranged on both sides of the main detection elements 131 and 231. In the present embodiment, in the package 355, the center of the detection element 131, the axis Ax, the center of the package 355, and the center of the detection element 132 are arranged in this order from one side. In the package 356, the center of the detection element 232, the center of the package 356, the center of the detection element 231, and the axis Ax are arranged in this order from one side. Further, a distance Y31 between the detection element 132 and the center of the magnet 875 is different from a distance Y32 between the detection element 232 and the center of the magnet 875. That is, Y31 is not Y32 (Y31≠Y32). The distance Y31 is smaller than the distance Y32. That is, Y31 is smaller than Y32 (Y31<Y32).

The packages 355 and 356 are arranged so that the centers thereof are arranged on both sides with respect to the axis Ax. In the present embodiment, the distance Z31 between the center of the package 355 and the axis Ax is smaller than the distance Z32 between the center of the package 356 and the axis Ax. That is, Z31 is not 0, Z32 is not 0, Z31 is not equal to Z32, and Z31 is smaller than Z32 (Z31≠0, Z32≠0, Z31≠Z32, and Z31<Z32).

In the present embodiment, as in the sixth embodiment, the packages 355 and 356 are provided on both surfaces of the substrate 470 so that the main detection elements 131 and 231 are arranged at the same position with respect to the substrate 470 interposed therebetween. By arranging the main detection elements 131 and 231 close to the axial center of the magnet 875, it is possible to arrange the sub detection elements 132 and 232 in a region where the detection accuracy is relatively good while ensuring the detection accuracy of the main detection elements 131 and 231. In addition, the sub detection elements 132 and 232 are not arranged on both sides of the substrate 470 at the same location but at different locations, so that the degree of freedom of component layout on the substrate 470 is improved. Thus, effects similarly to those of the embodiments described above will be produced.

Ninth Embodiment and Tenth Embodiment

Figure 16:
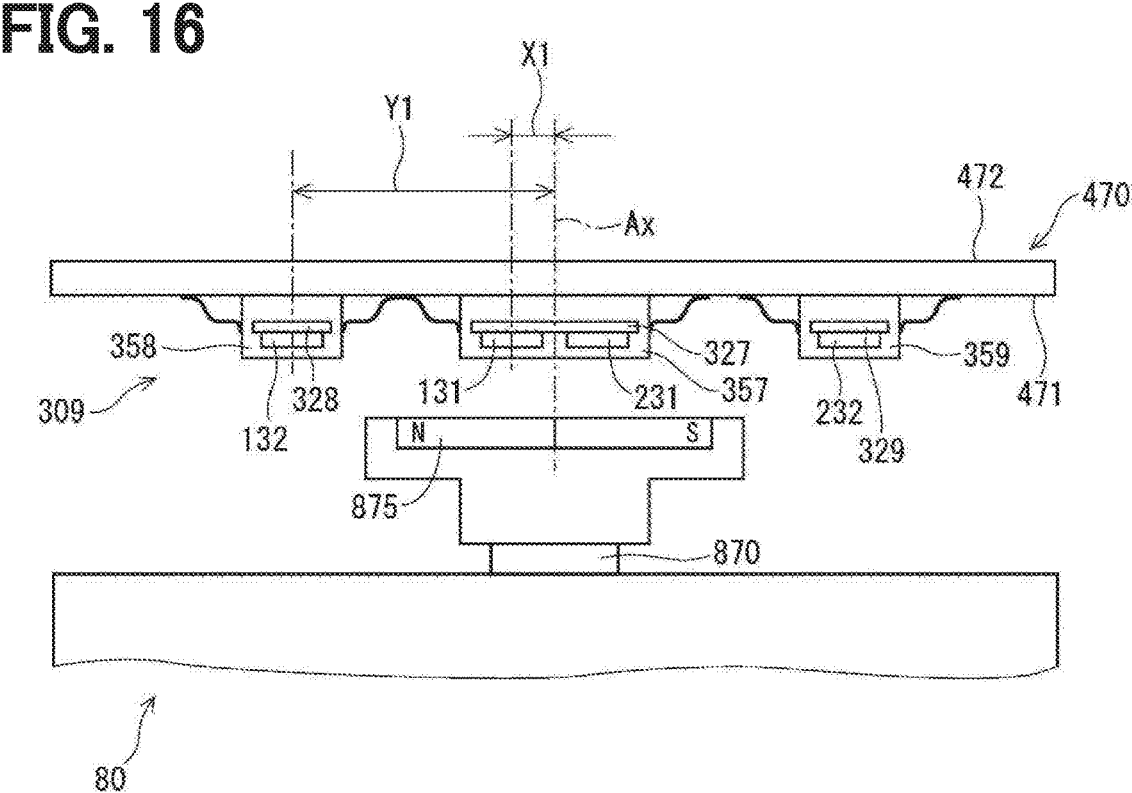
FIG. 16 is a schematic diagram showing a rotation angle sensor and a magnet according to a ninth embodiment.
Figure 17:
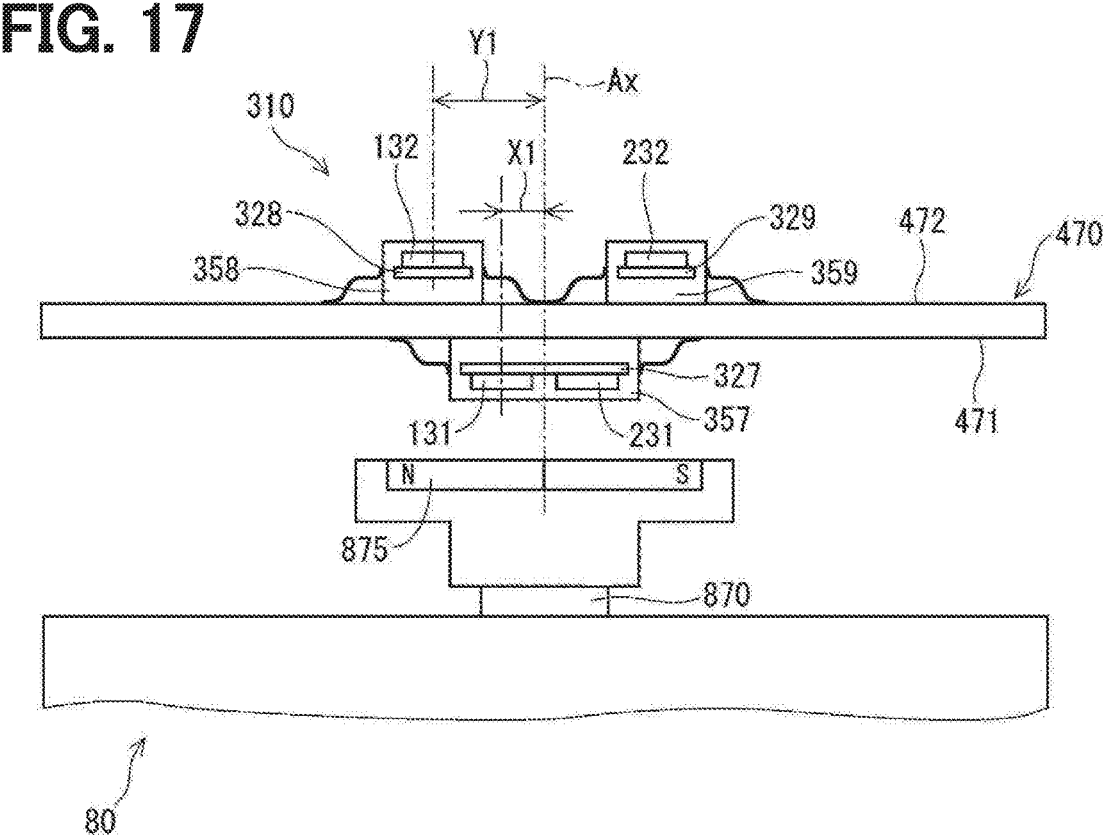
FIG. 17 is a schematic diagram showing a rotation angle sensor and a magnet according to a tenth embodiment.

FIG. 16 shows the ninth embodiment and FIG. 17 shows the tenth embodiment. The rotation angle sensor 309 of the ninth embodiment includes a package 357 that is a main package that includes the main detection elements 131 and 231, a package 358 that is a sub package that includes the sub detection element 132, and a sub package 359 that includes the sub detection element 232. That is, in the present embodiment, the main detection elements 131 and 231 are arranged in one package, and the sub detection elements 132 and 232 are arranged in different packages. The packages 357 to 359 are mounted on the motor-side surface 471 of the substrate 470. In FIG. 16, the detection elements 131 and 231 are mounted on the side of the lead frame 327 opposite to the substrate 470, and the detection elements 132 and 232 are mounted on the side of the lead frames 328 and 329 opposite to the substrate 470. However, the detection elements 131, 231, 132, 232 are mounted on the side of the lead frame 327 on the substrate 470 side.

The center of the package 357 is arranged on the axis Ax. The main detection elements 131 and 231 are symmetrically arranged on both sides with respect to the center of the magnet 875. Further, the packages 358 and 359 are symmetrically arranged on both sides of the package 357 with respect to the axis Ax interposed therebetween. Therefore, as in the above embodiment, the distance X1 between the main detection elements 131 and 231 and the center of the magnet 875 is smaller than the distance Y1 from the sub detection elements 132 and 232 and the center of the magnet 875. That is, X1 is smaller than Y1 (X1<Y1).

As shown in FIG. 17, in the tenth embodiment, the rotation angle sensor 310 has packages 357 to 359, as in the ninth embodiment. The package 357 including the main detection elements 131 and 231 is mounted on the motor-side surface 471 of the substrate 470 and on the axis Ax, as in the ninth embodiment. The packages 358 and 359 having the sub detection elements 132 and 232 are mounted on the cover-side surface 472 of the substrate 470. The packages 357 and 358 are symmetrically arranged on both sides with respect to the axis Ax interposed therebetween, and at least a part of the packages 357 and 358 are arranged so as to overlap with a projection region of the package 357 in the axial direction of the motor 80. Therefore, as in the above embodiment, the distance X1 between the main detection elements 131 and 231 and the center of the magnet 875 is smaller than the distance Y1 from the sub detection elements 132 and 232 and the center of the magnet 875. That is, X1 is smaller than Y1 (X1<Y1).

Even with the above configuration, the detection accuracy of the main detection elements 131 and 231 can be ensured, and the sub detection elements 132 and 232 can also be arranged in a region where the detection accuracy is relatively good. Thereby, the same effect as the above embodiment can be provided.

Eleventh Embodiment

Figure 18:
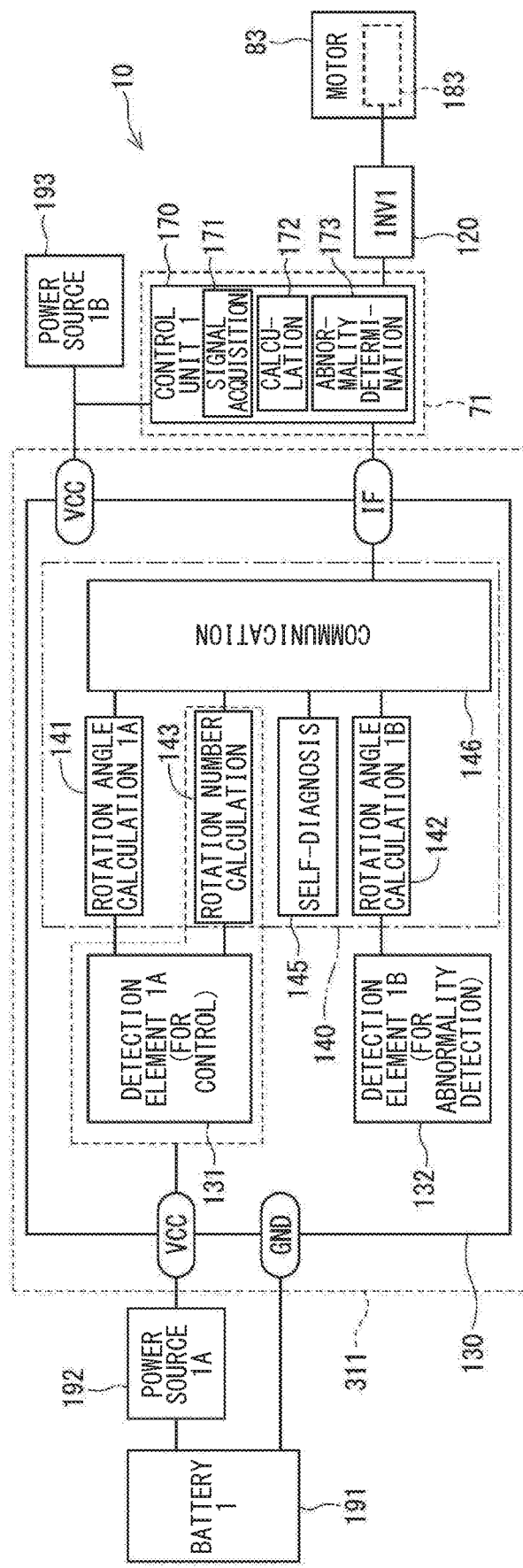
FIG. 18 is a block diagram showing an ECU according to an eleventh embodiment.

The eleventh embodiment is shown in FIGS. 18 to 21. As shown in FIG. 18, the motor 83 has a set of motor windings 183, and the driving device 40 (not shown in FIG. 18) is configured by one system. In FIG. 18, the configuration on the second system L2 side in FIG. 4 is omitted. That is, in the rotation angle sensor 311 of the present embodiment, the second sensor unit 230 is omitted, and in the calculation device 71, the second control unit 270 is omitted.

Figure 19:
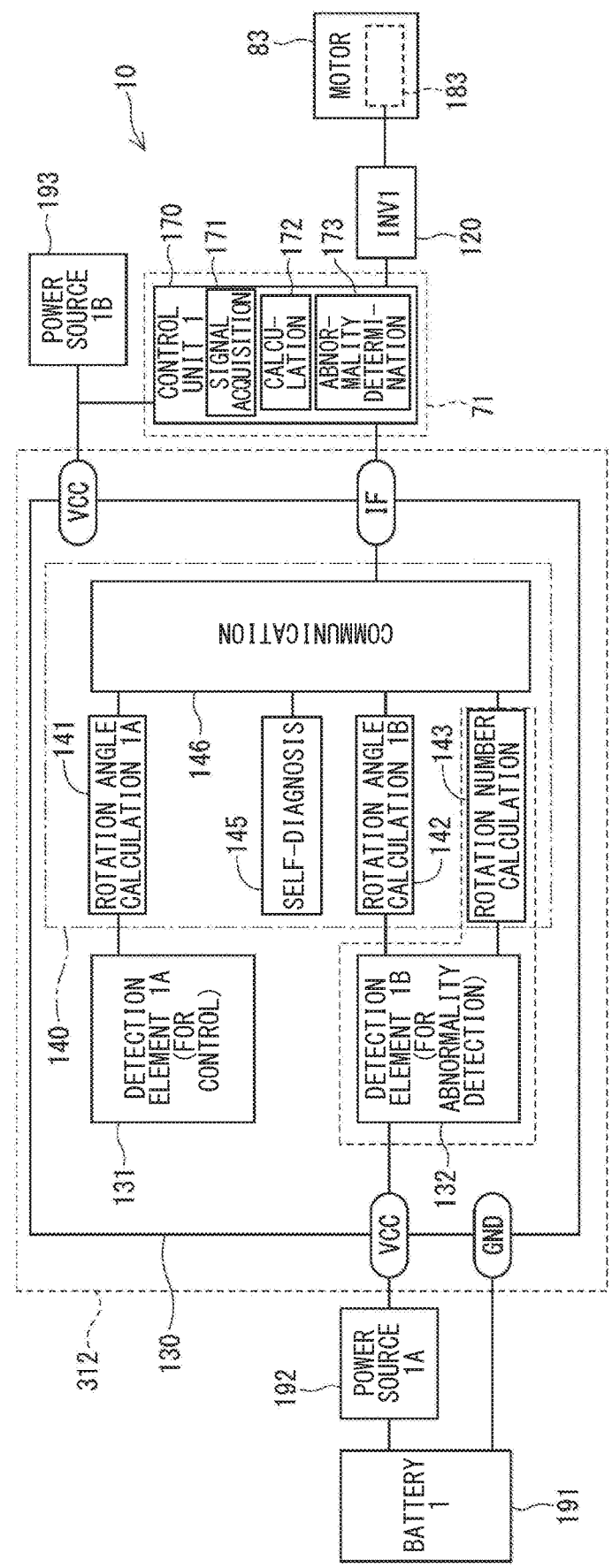
FIG. 19 is a block diagram showing an ECU according to the eleventh embodiment.

As in the rotation angle sensor 312 shown in FIG. 19, the rotation number calculation unit 143 may calculate the rotation number TC1 using the detection value of the sub detection element 132. In this case, the detection element 132 and the rotation number calculation unit 143 surrounded by the broken line are constantly supplied with power via the power source 192, and the detection and calculation are continued. In the sensor unit 130, power is supplied to the components other than the detection element 132 and the rotation number calculation unit 143 via the power source 193 when the start switch is turned on, and stopped when the start switch is turned off.

The element for the abnormality detection and the rotation number calculation may have lower accuracy than the element for the rotation angle calculation, and the configuration on the abnormality detecting side including the detecting element can be simplified. For example, a TMR element or an AMR element with high detection accuracy is used as the main detection element 131, a low power consumption TMR element or a relatively low-cost Hall element is used as the sub detection element 132, and a combination thereof is preferable. By using different types of elements for the detection elements 131 and 132, it is possible to prevent a failure due to the same cause and it is preferable in terms of functional safety. Even in the case of two systems, the number of rotations TC1 and TC2 may be calculated using the sub detection elements 132 and 232.

Figure 20:
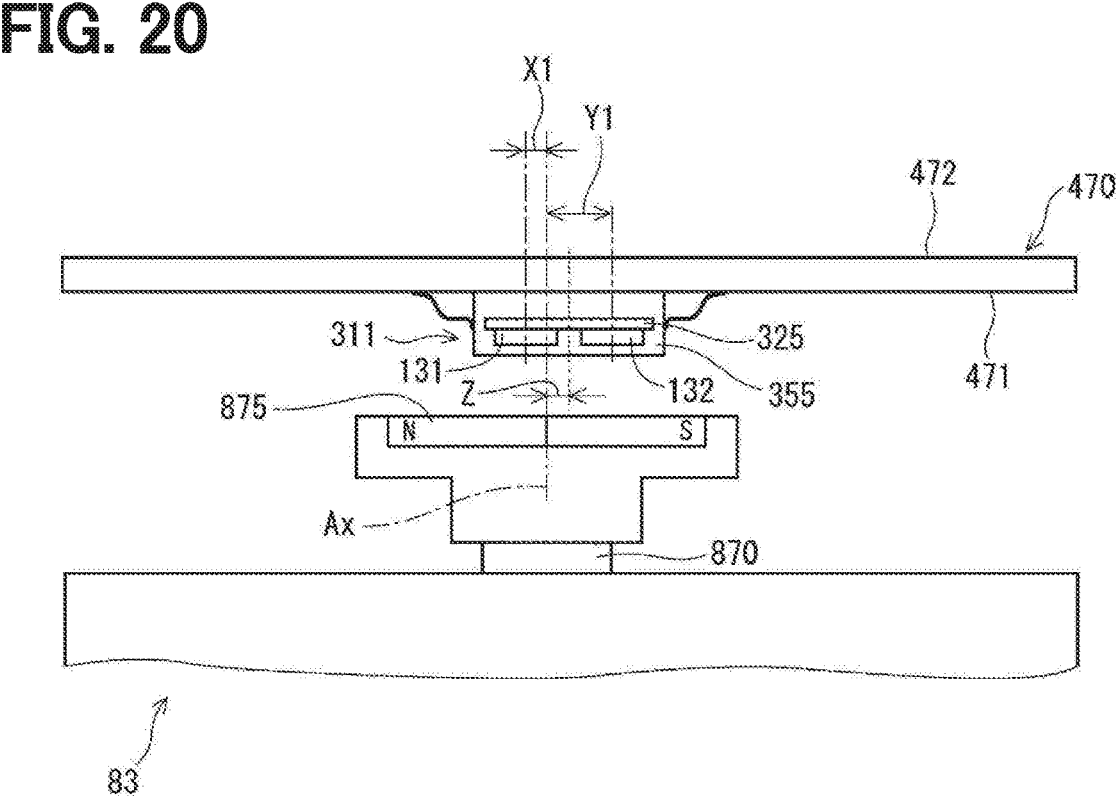
FIG. 20 is a schematic view showing a rotation angle sensor and a magnet according to the eleventh embodiment.
Figure 21:
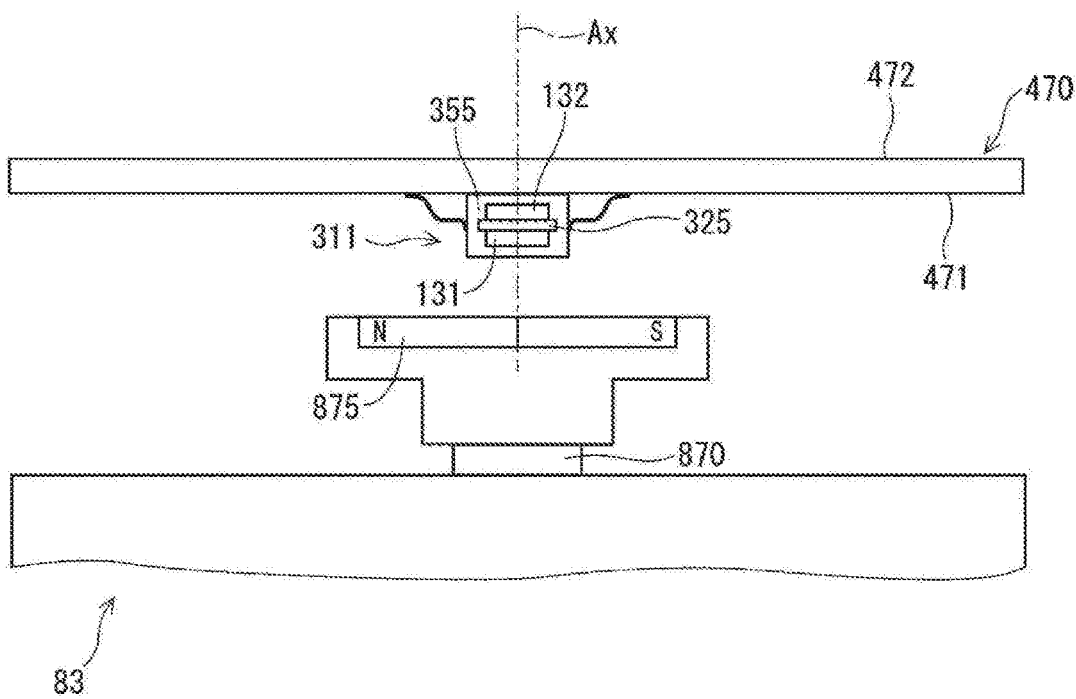
FIG. 21 is a schematic diagram showing a rotation angle sensor and a magnet according to the eleventh embodiment.

The arrangement of the detection elements 131 and 132 will be described based on FIGS. 20 and 21. In FIGS. 20 and 21, an example of the rotation angle sensor 311 will be described, but the same applies to the rotation angle sensor 312.

As shown in FIG. 20, the rotation angle sensor 311 of the present embodiment is similar to the rotation angle sensor 311 of the sixth embodiment in which the package 356 is omitted (see FIG. 13), and the package 355 is mounted on the motor-side surface 471 of the substrate 470. Further, the centers of the detection elements 131 and 132 are both displaced from the axis Ax, and the distance X1 between the center of the main detection element 131 and the axis Ax is smaller than the distance Y1 between the center of the sub detection element 132 and the axis Ax. That is, X1 is smaller than Y1 (X1<Y1). This configuration also achieves the same effects as those of the embodiment described above.

Further, like the rotation angle sensor 311 shown in FIG. 21, the detection elements 131 and 132 may be respectively mounted on both surfaces of the lead frame 325. In this case, the centers of the detection elements 131 and 132 may be aligned with the center of the magnet 875. Further, it is preferable to arrange the detection element 131 for control so as to have an optimum gap.

Twelfth Embodiment and Thirteenth Embodiment

Figure 22:
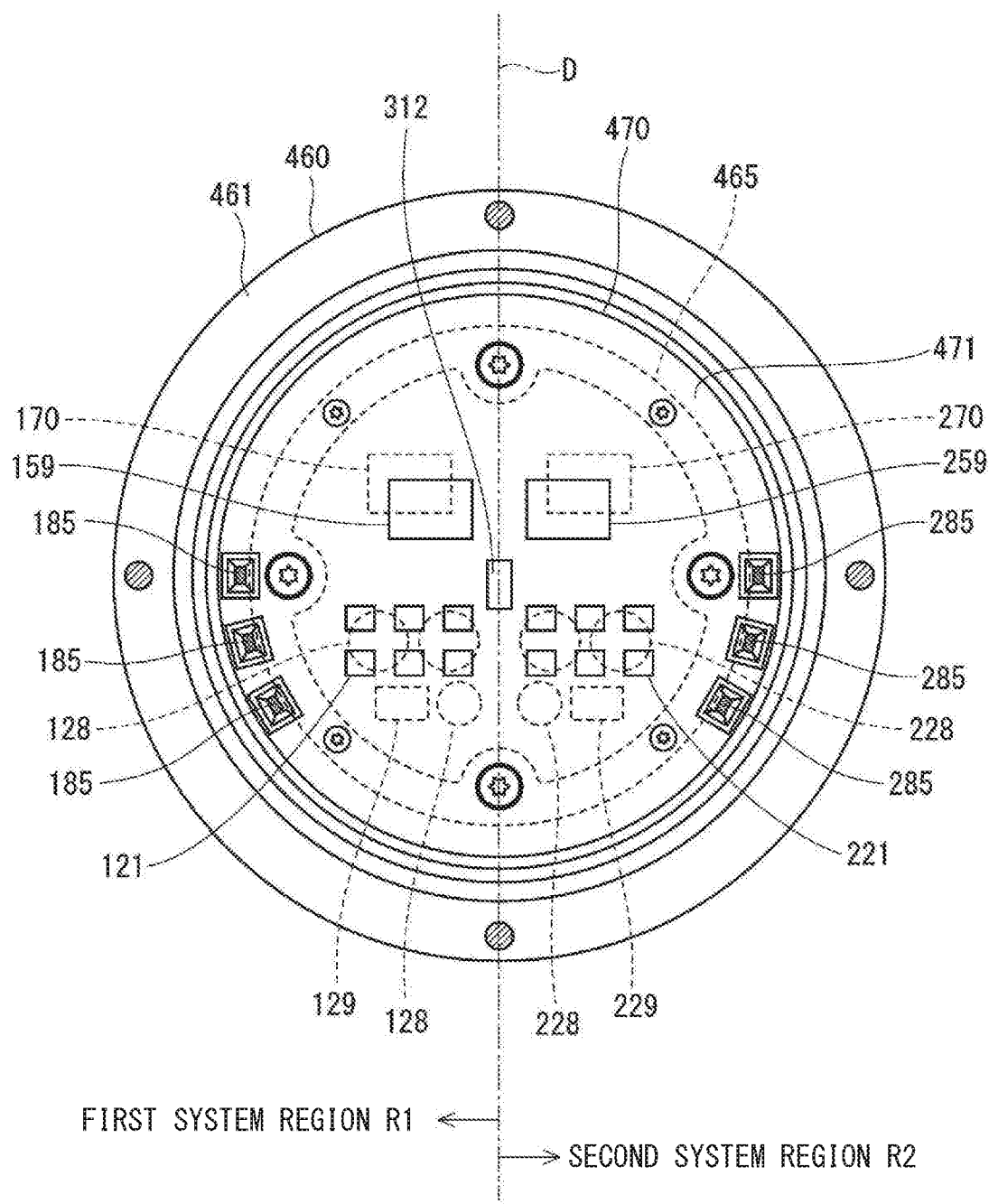
FIG. 22 is a cross sectional view illustrating an arrangement of a rotation angle sensor on a substrate according to a twelfth embodiment.
Figure 23:
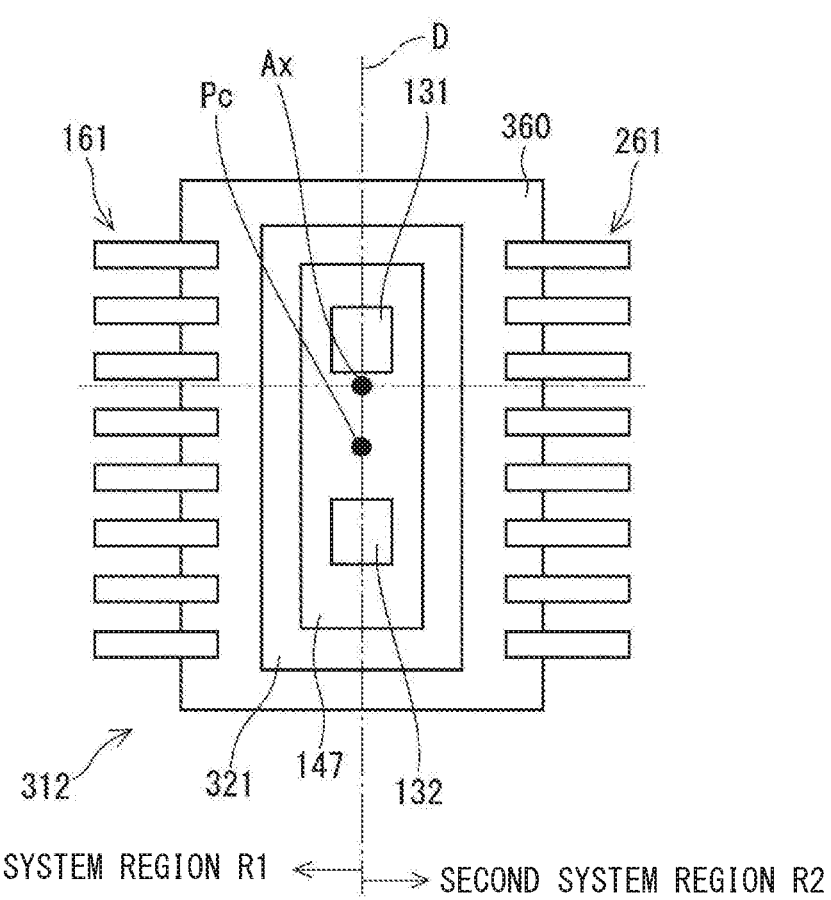
FIG. 23 is a schematic diagram showing a rotation angle sensor according to a twelfth embodiment.
Figure 24:
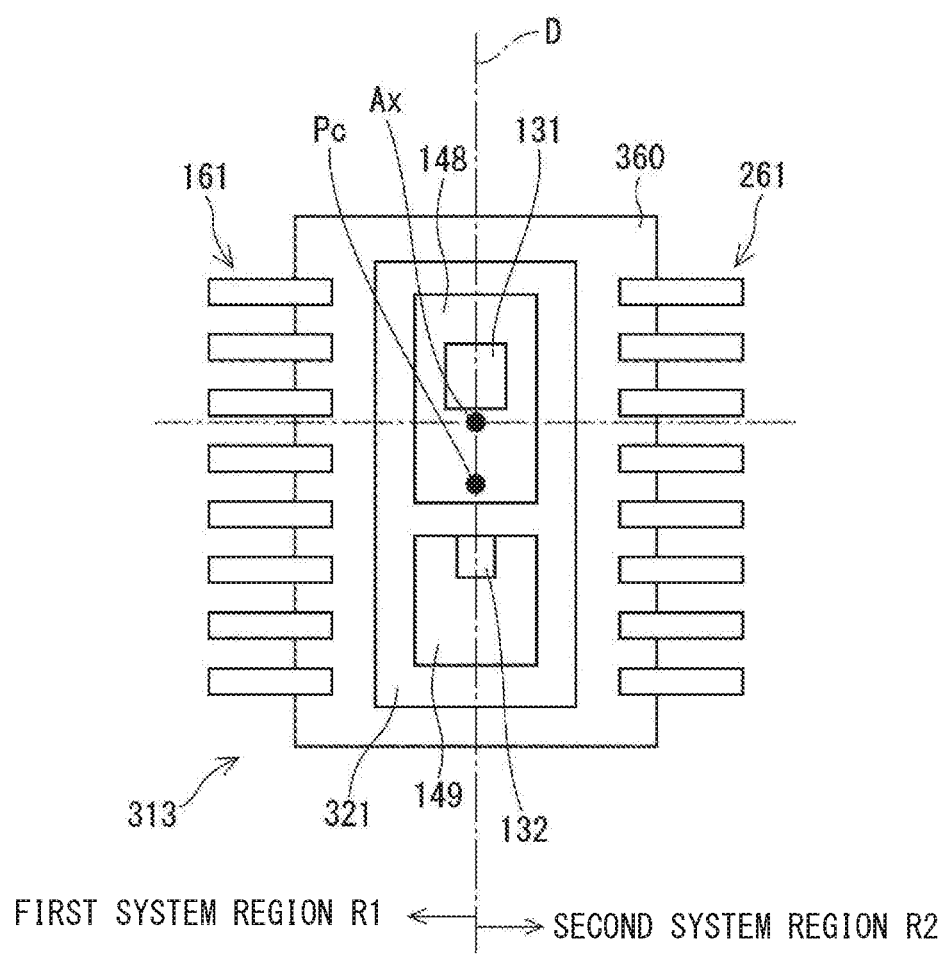
FIG. 24 is a schematic diagram showing a rotation angle sensor according to a thirteenth embodiment.
Figure 25:
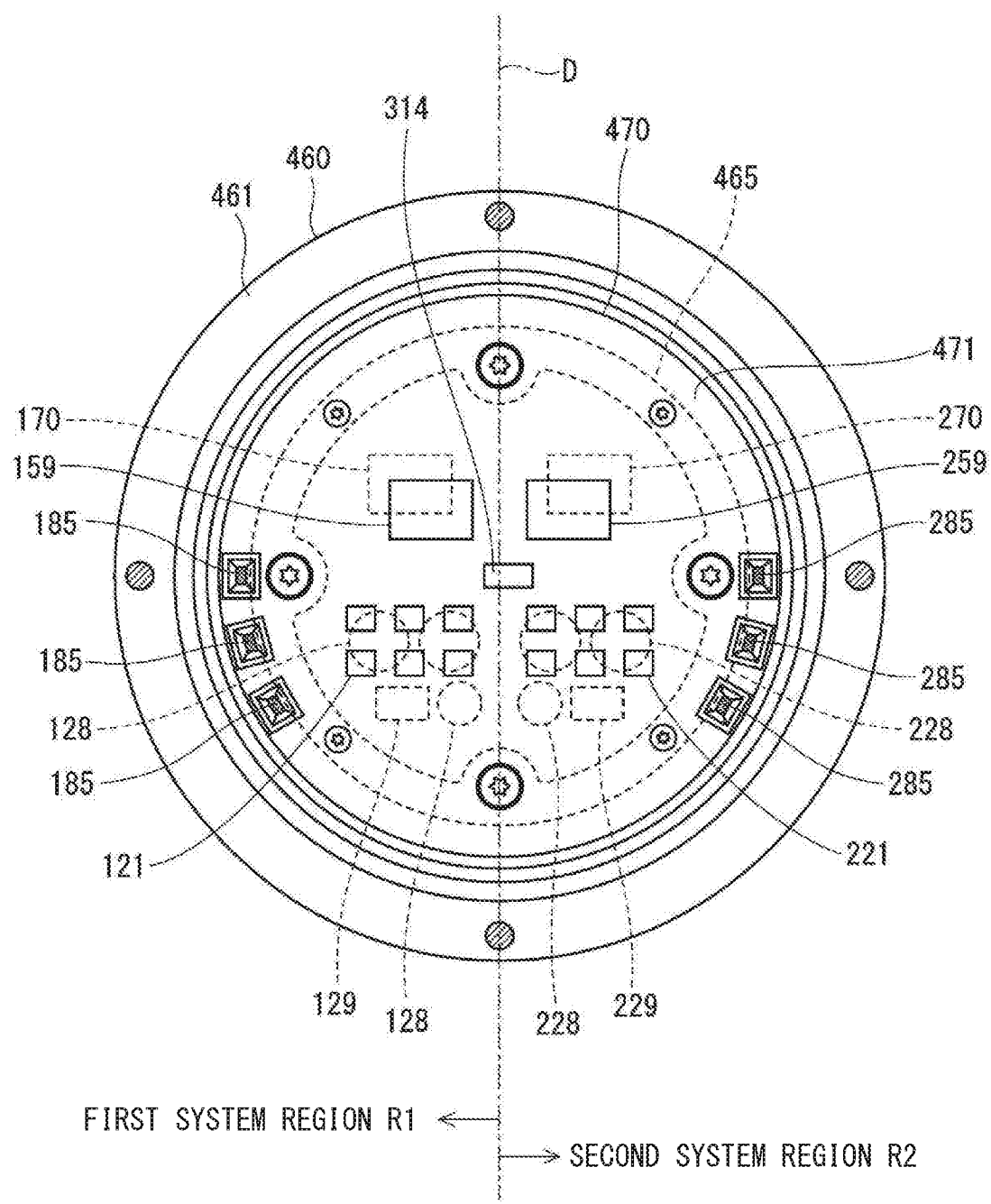
FIG. 25 is a sectional view illustrating an arrangement of a rotation angle sensor on a substrate according to a fourteenth embodiment.

The twelfth to eighteenth embodiments will mainly describe the arrangement of the rotation angle sensor and the substrate. The configuration of the rotation angle sensor is not limited to that described below, but may be that of the above embodiment. The twelfth embodiment is shown in FIGS. 22 and 23. FIG. 22 and FIG. 25 described later are cross sectional views corresponding to FIG. 3 of the first embodiment. In FIG. 23, the internal structure of the rotation angle sensor 312 is schematically shown. The same applies to FIG. 24 and the like. As shown in FIGS. 22 and 23, in the rotation angle sensor 312 of the present embodiment, the package 360 is formed in a substantially rectangular shape in plan view, and is arranged on the substrate 470 such that the long side of the package 360 and the boundary line D is parallel to each other. Therefore, the rotation angle sensor 312 is divided into system regions R1 and R2 in the longitudinal direction. Further, the center Pc of the package is located on the boundary line D.

As shown in FIG. 23, lead terminals 161 and 261 are provided on both long sides of the package 360. The lead terminal 161 is a terminal arranged on the first system region R1 side and is connected to the first control unit 170. The lead terminal 261 is a terminal arranged on the second system region R2 side and is connected to the second control unit 270. The terminals of the first system are arranged close to the first system region R1 side and the terminals of the second system are arranged close to the second system region R2 side, so that the substrate design becomes easy.

As in the first embodiment, in the rotation angle sensor 312 of the present embodiment, the detection elements 131 and 132 of the first system L1 are mounted on one surface of the lead frame 321 and the detection elements 231 and 232 of the second system L2 are mounted on the other surface thereof. That is, in the present embodiment, the detection elements 131, 132, 231, 232 are mounted on both sides of the lead frame 321.

An arithmetic circuit element 147 is mounted on one surface of the lead frame 321. In the arithmetic circuit element 147, various calculations in the signal processing unit 140 are performed. The detection elements 131 and 132 are mounted on the surface of the arithmetic circuit element 147 opposite to the lead frame 321. A configuration in which the detection element is mounted on the arithmetic circuit element on the lead frame is also included in the concept of "the detection element is mounted on the lead frame".

Further, on the other surface of the lead frame 321, the arithmetic circuit element that performs various calculations in the signal processing unit 240 is mounted, as in the first system L1, and the detection elements 231, 232 are mounted on the surface of the arithmetic circuit element opposite to the lead frame 321. The configuration on the first system side and the configuration on the second system side are similarly arranged with the lead frame 321 interposed therebetween. In FIGS. 23 and 24, the illustration and description of the configuration on the second system side are omitted.

Similar to the above described embodiment, the detection elements 131 and 132 are provided at positions deviated from the axis Ax which is the rotation center of the magnet 875 and on both sides with respect to the axis Ax interposed therebetween. Further, the detection element 131 for control is arranged closer to the axis Ax than the position of the detection element 132 for abnormality detection. In the present embodiment, the detection elements 131 and 132 are both arranged on the boundary line D. In the present embodiment, the detection elements 131 and 132 inside the rotation angle sensor 312 are symmetrically arranged, and the package center Pc is displaced from the axis Ax. Therefore, the detection element 131 for control is arranged closer to the axis Ax than the detection element 132 for abnormality detection.

In the rotation angle sensor 313 of the thirteenth embodiment shown in FIG. 24, two arithmetic circuit elements 148 and 149 are mounted on one surface of the lead frame 321. The detection element 131 is mounted on the surface of the arithmetic circuit element 148 opposite to the lead frame, and the detection element 132 is mounted on the surface of the arithmetic circuit element 149 opposite to the lead frame 321. In the arithmetic circuit element 148, the rotation angle calculation unit 141 and the rotation number calculation unit 143 perform the calculation, and in the calculation circuit element 149, the rotation angle calculation unit 142 performs the calculation. The processing of the self-diagnosis unit 145 and the communication unit 146 is performed by the arithmetic circuit element 148, but may be performed by the arithmetic circuit element 149.

That is, in the present embodiment, the arithmetic circuit elements 148 and 149 are provided separately for control and for abnormality detection. Since the detection element 132 for abnormality detection and the arithmetic circuit element 149 are not required to have accuracy as compared with those for control, they have a simpler configuration than the detection element 131 for control and the arithmetic circuit element 148. As a result, a heterogeneous redundancy design is achieved, so that it is possible to prevent the arithmetic circuit elements 148, 149 from simultaneously failing. The arithmetic circuit elements 148 and 149 may be similarly configured.

Also in the present embodiment, the detection elements 131 and 132 are arranged at positions displaced from the axis Ax, and the detection element 131 for control is arranged closer to the axis Ax than the detection element 132 for abnormality detection. The axis Ax is located in the package area and in the area of the arithmetic circuit element 148. The detection element 132 is provided on the arithmetic circuit element 148 and at the end portion on the arithmetic circuit element 149 side.

The rotation angle sensors 312 and 313 are mounted on the substrate 470 which is divided into the first system region R1 and the second system region R2. The first main detection element 131 and the second main detection element 231 are arranged on the boundary line D that divides the first system region R1 and the second system region R2. As a result, it is possible to reduce the detection error between the systems.

The rotation angle sensors 312 and 313 have lead terminals 161 and 261 provided on the outer edge of the package 360. The lead terminal 161 arranged on the first system region R1 side outputs a signal related to the detection value of the first main detection element 131 to the first control unit 170. The lead terminal 162 arranged in the second system region R2 outputs a signal related to the detection value of the second main detection element to the second control unit 270. Therefore, substrate wiring becomes easy. In addition, the same effects as those of the above embodiment can be obtained.

Fourteenth Embodiment and Fifteenth Embodiment

Figure 26:
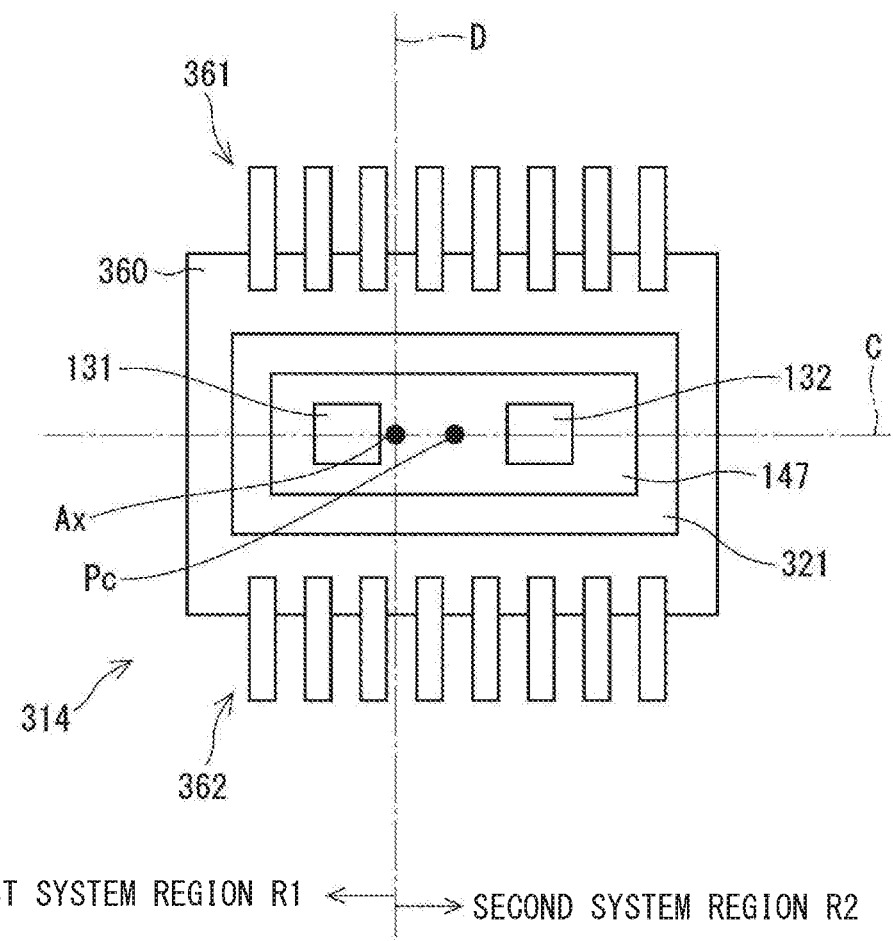
FIG. 26 is a schematic diagram showing a rotation angle sensor according to the fourteenth embodiment.

The fourteenth embodiment is shown in FIGS. 25 and 26. The internal configuration of the rotation angle sensor 314 of the present embodiment is similar to that of the rotation angle sensor 312 of the twelfth embodiment. The internal configuration of the rotation angle sensor 314 of this embodiment is similar to that of the rotation angle sensor 312 of the twelfth embodiment. The rotation angle sensor 314 is arranged on the substrate 470 such that the short side of the package 360 having a substantially rectangular shape in plan view and the boundary line D are parallel to each other. As shown in FIG. 26, the package center Pc is displaced from the boundary line D. In the present embodiment, the package center Pc is located in the second system region R2. Depending on the substrate configuration and the sensor configuration, the package center Pc may be on the first system region R1 side so that the detection element 131 for control is closer to the axis Ax than the detection element 132 for abnormality detection.

The lead terminal 361 is provided on one long side of the package 360, and the lead terminal 362 is provided on the other long side of the package 360. In the present embodiment, among the lead terminals 361, n terminals from the end on the first system region R1 side are connected to the first control unit 170, and m terminals from the end on the second system region R2 side are connected to the second control unit 270. Further, among the lead terminals 362, m terminals from the end on the first system region R1 side are connected to the first control unit 170, and n terminals from the end on the second system region R2 side are connected to the second control unit 270. n+m is arbitrarily set so as to be equal to or less than the number of lead terminals 361 and 362. n and m may be the same or different. In the present embodiment, since the package 360 is closer to the second system region R2 side, some of the terminals connected to the first control unit 170 may be arranged in the second system region R2. In addition, depending on the settings of n and m, some of the terminals connected to the second control unit 270 may be arranged in the first system region R1. The above-described arrangement is included in the concept that "the lead terminal arranged on the first system area side outputs a signal related to the detection value of the first main detection element, and the lead terminal arranged on the second system area side outputs a signal related to the detection value of the second main detection element".

Figure 27:
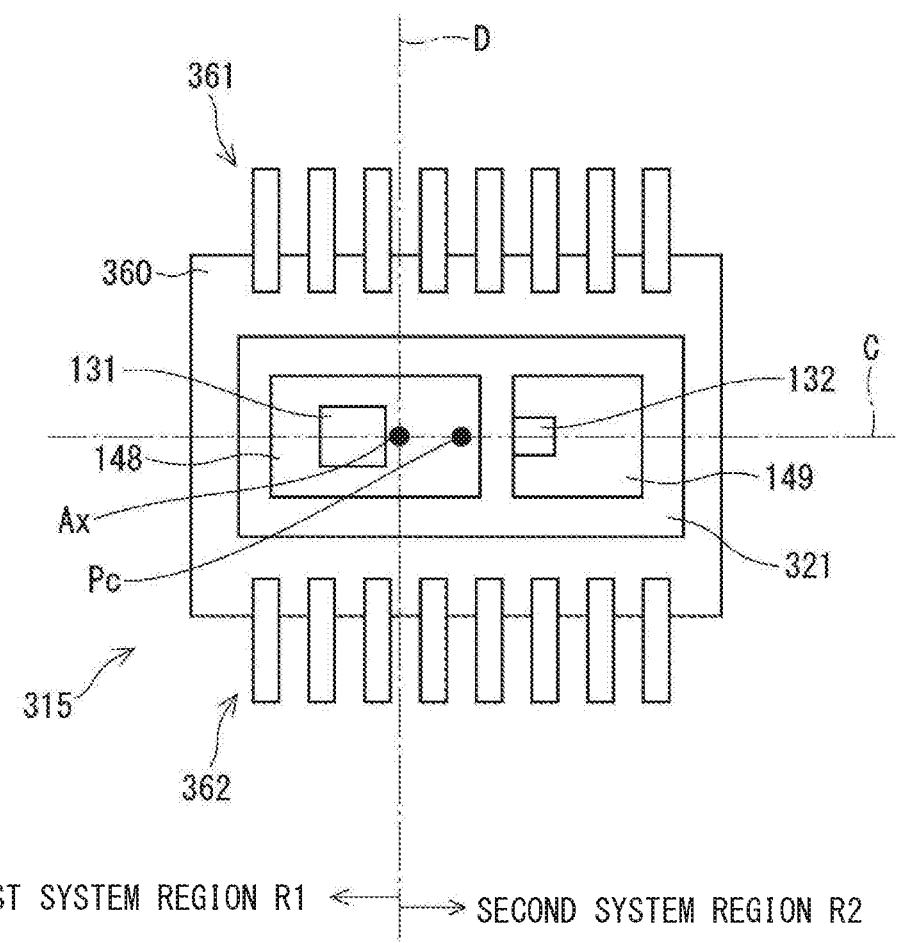
FIG. 27 is a schematic diagram showing a rotation angle sensor according to a fifteenth embodiment.

The fifteenth embodiment is shown in FIG. 27. The internal configuration of the rotation angle sensor 315 of the present embodiment is the same as that of the rotation angle sensor 313 of the thirteenth embodiment. Further, similarly to the fourteenth embodiment, the rotation angle sensor 315 is arranged on the substrate 470 such that the short side of the package 360 and the boundary line D are parallel to each other. In the present embodiment, the axis Ax and the package center Pc are located within the region of the arithmetic circuit element 148, as in the thirteenth embodiment. The arrangement details of the rotation angle sensor 315 are the same as in the fourteenth embodiment.

The rotation angle sensors 314 and 315 are mounted on the substrate 470 that is divided into a first system region R1 and a second system region R2. The package 360 is arranged such that the first main detection element 131 is located in the first system region R1 and the second main detection element 231 is located in the second system region R2. Therefore, the substrate wiring becomes easy. In addition, the same effects as those of the above embodiment can be obtained.

Sixteenth Embodiment

Figure 28:
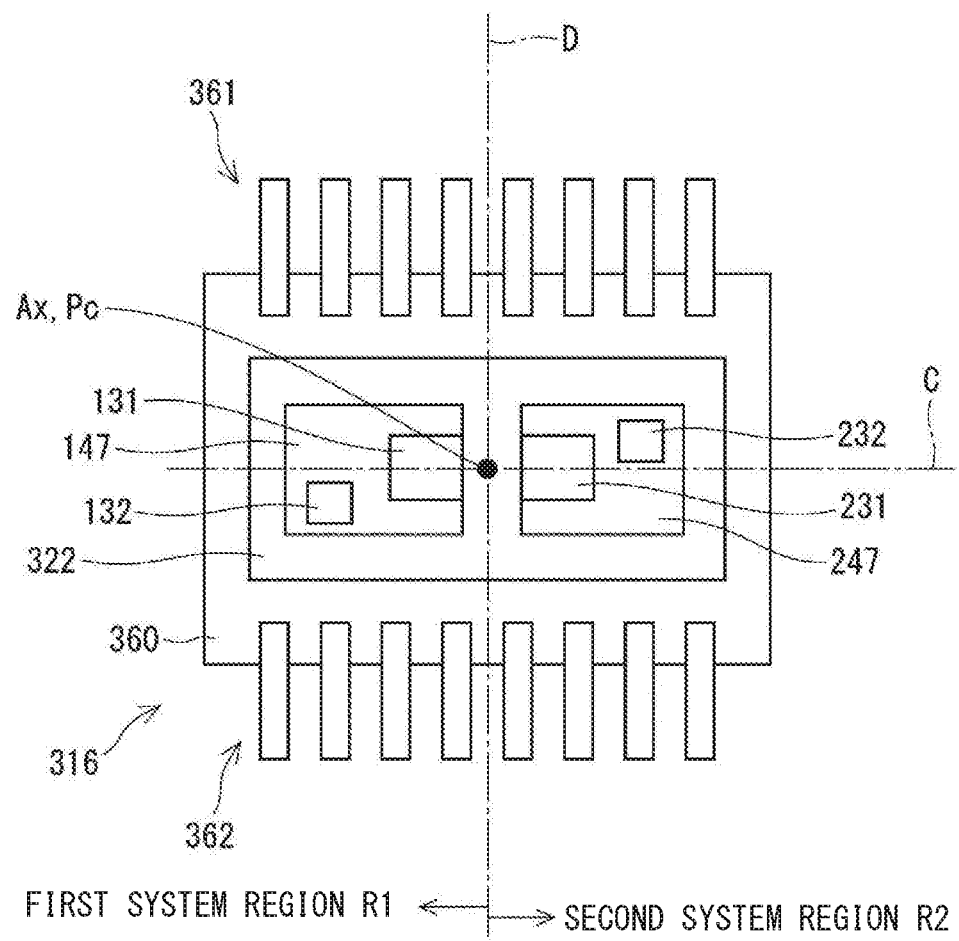
FIG. 28 is a schematic diagram showing a rotation angle sensor according to a sixteenth embodiment.

The sixteenth embodiment is shown in FIG. 28. The rotation angle sensor 316 of the present embodiment is arranged on the substrate 470 such that the short side of the package 360 and the boundary line D are parallel to each other, as in the fourteenth embodiment. In the present embodiment, the axis Ax coincides with the package center Pc. The detection elements 131, 132, 231, 232 of the rotation angle sensor 316 are all mounted on the surface of the lead frame 322 that faces the magnet 875, similarly to the rotation angle sensor 303 of the third embodiment (see FIG. 9).). That is, in the present embodiment, the detection elements 131, 132, 231, 232 are mounted on the lead frame 322 on one side. The lead terminals 361 and 362 are the same as in the fifteenth embodiment.

In the present embodiment, the arithmetic circuit elements 147 and 247 are both mounted on the surface of the lead frame 321 facing the magnet 875. The first arithmetic circuit element 147 is arranged in the first system region R1, and the second arithmetic circuit element 247 is arranged in the second system region R2. In the second arithmetic circuit element 247, various calculations in the signal processing unit 240 are performed. The detection elements 131 and 132 are mounted on the surface of the first arithmetic circuit element 147 opposite to the lead frame 322, and the detection elements 231 and 232 are mounted on the surface of the second arithmetic circuit element 247 opposite to the lead frame 322. The arithmetic circuit elements 147 and 247 are separated by the boundary line D.

The detection element 131 for control is arranged on the arithmetic circuit element 147 and at the end on the axis Ax side. Further, the detection element 231 for control is arranged on the arithmetic circuit element 247 and at the end on the axis Ax side.

The detection element 132 for abnormality detection is arranged on the arithmetic circuit element 147 and outside the detection element 131 for control. Further, the element detection 232 for abnormality detection is arranged on the arithmetic circuit element 247 and outside the detection element 231 for control. As in the thirteenth embodiment and the like, arithmetic circuit elements may be separated for control and abnormality detection. The same also applies to the following embodiments.

The detection elements 131 and 231 are arranged on the center line C parallel to the long side of the package 360. Further, the detection elements 132 and 232 are arranged at positions deviated from the center line C. Further, the detection elements 132 and 232 are arranged point-symmetrically with respect to the package center Pc. In the present embodiment, the arithmetic circuit element 147 on which the detection elements 131 and 132 are mounted and the arithmetic circuit element 247 on which the detection elements 231 and 232 are mounted are formed in the same shape. The orientation of the arithmetic circuit elements 147 and 247 is point-symmetrical. As a result, the same component can be used, and the number of component types can be reduced. In FIG. 28, the detection elements 132 and 232 for abnormality detection are illustrated as being simpler and smaller than the detection elements 131 and 231 for control. However, the detection elements 132 and 232 for abnormality detection may have the same accuracy or the same size as the detection elements 131 and 231 for control. The same applies to embodiments described later.

In the present embodiment, the sub detection elements 132 and 232 are arranged at positions deviated from the straight line connecting the centers of the main detection elements 131 and 231 and the axis Ax. As a result, even if the number of detection elements for the redundant system increases, the detection accuracy of the main detection elements 131 and 231 can be ensured while suppressing the size increase of the magnet 875. Further, since the sub detection elements 132 and 232 can also be arranged at locations with relatively high detection accuracy, the magnet 875 can be downsized. Thus, effects similarly to those of the embodiments described above will be produced.

Seventeenth Embodiment

Figure 29:
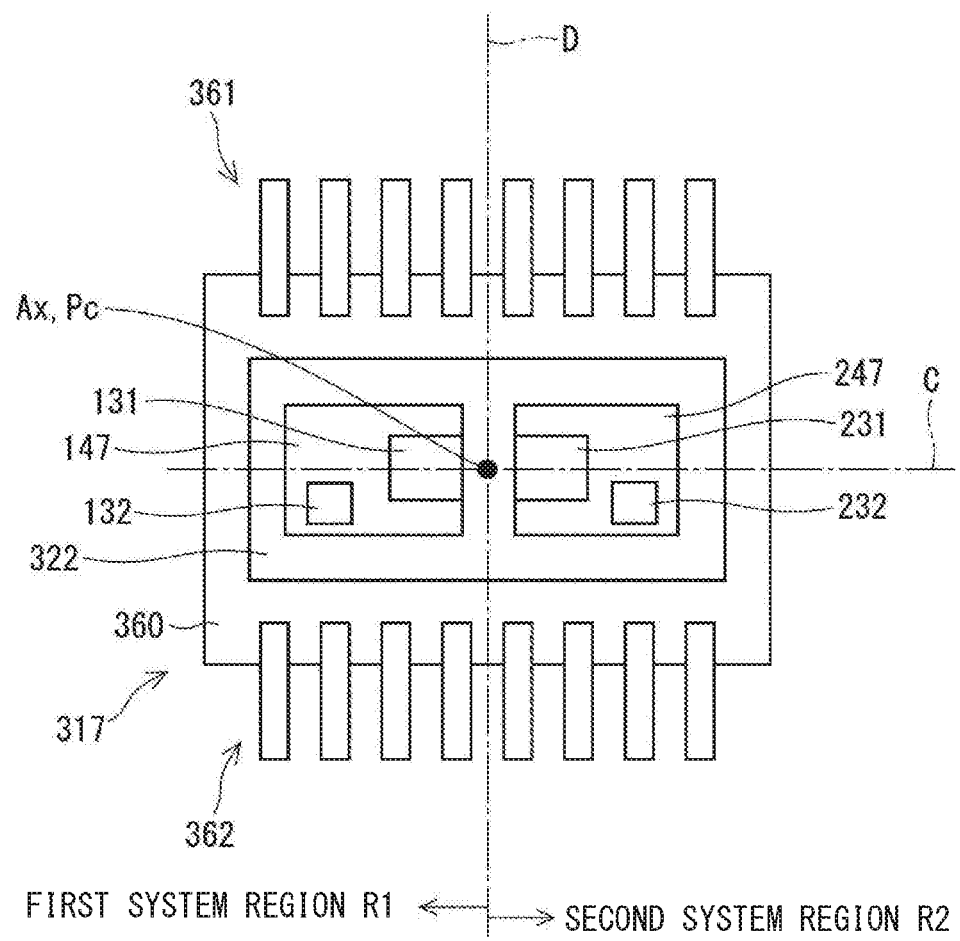
FIG. 29 is a schematic view showing a rotation angle sensor according to a seventeenth embodiment.

The seventeenth embodiment is shown in FIG. 29. The package 360 and the arithmetic circuit elements 147 and 247 of the rotation angle sensor 317 in the present embodiment are arranged in the same manner as in the sixteenth embodiment. The detection elements 131 and 231 for control are arranged on the center line C, and the detection elements 132 and 232 for abnormality detection are arranged at positions deviated from the center line C. The detection elements 131 and 232 are both arranged on one long side with respect to the center line C and are arranged symmetrically with respect to the boundary line D. Further, as in the third embodiment, the detection elements 132 and 232 for abnormality detection may be arranged on the center line C and outside the detection elements 131 and 231 for control (see FIG. 30).

Figure 30:
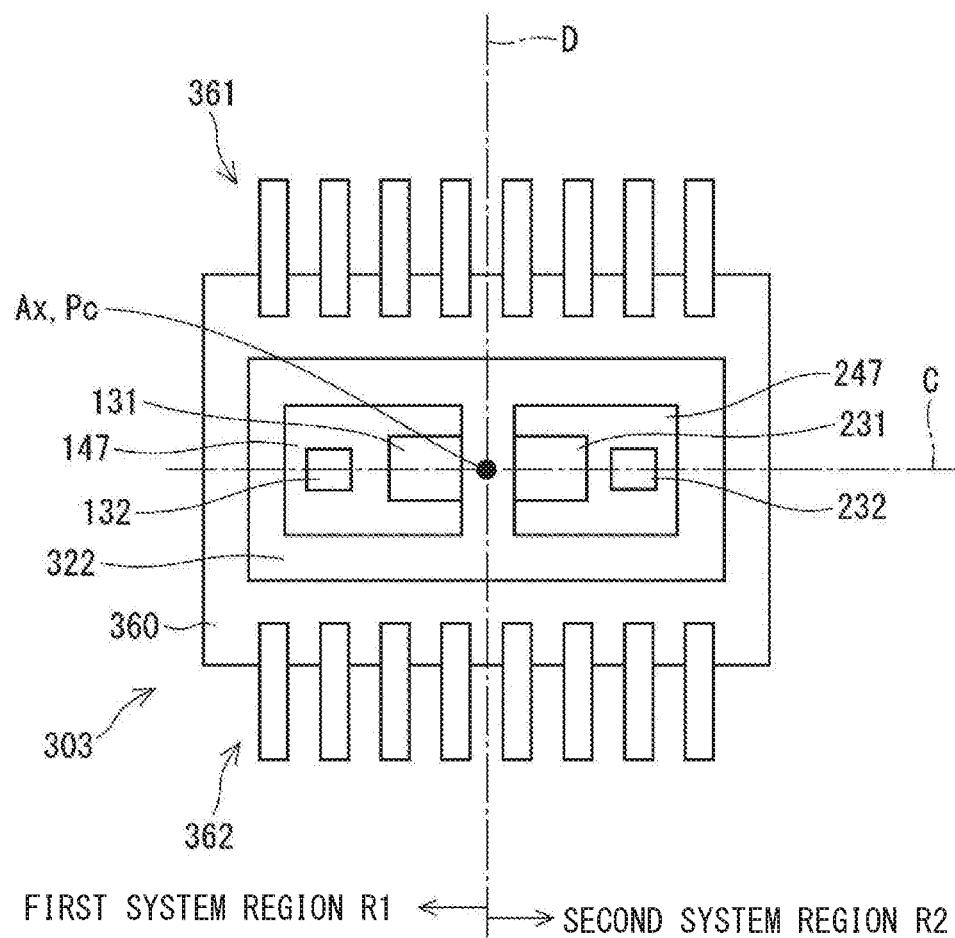
FIG. 30 is a schematic view showing a rotation angle sensor according to the third embodiment.
Figure 31:
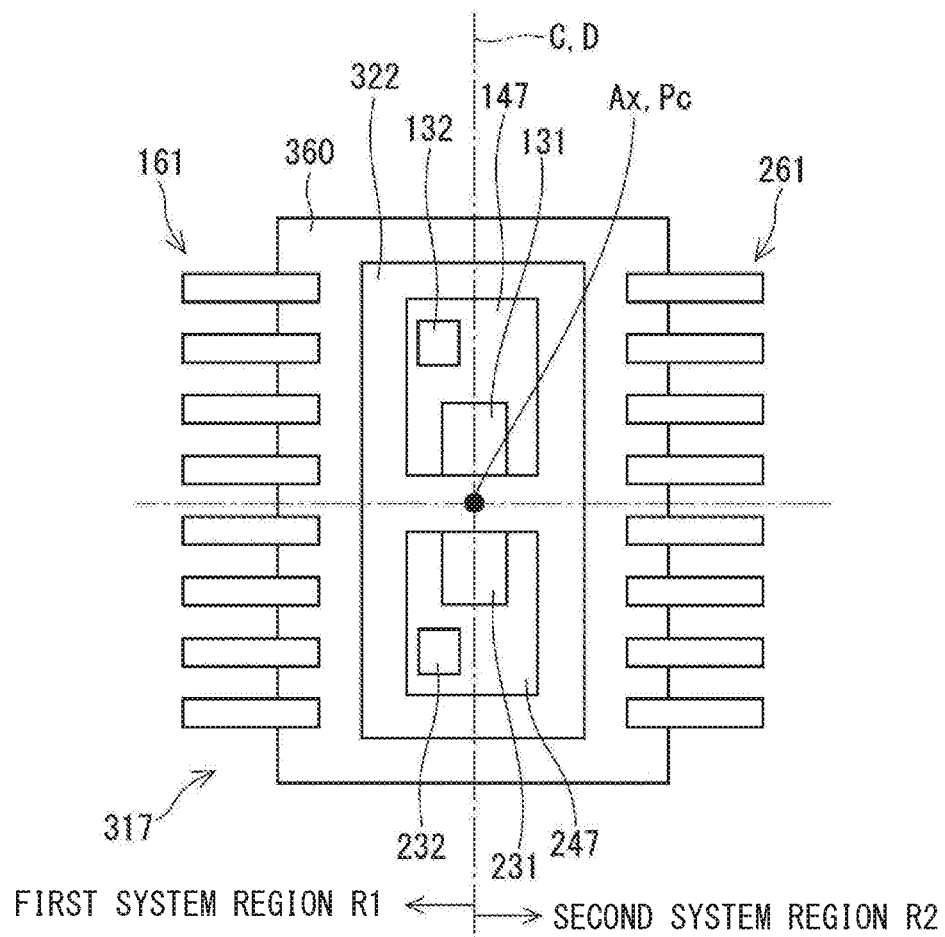
FIG. 31 is a schematic view showing a rotation angle sensor according to the seventeenth embodiment.
Figure 32:
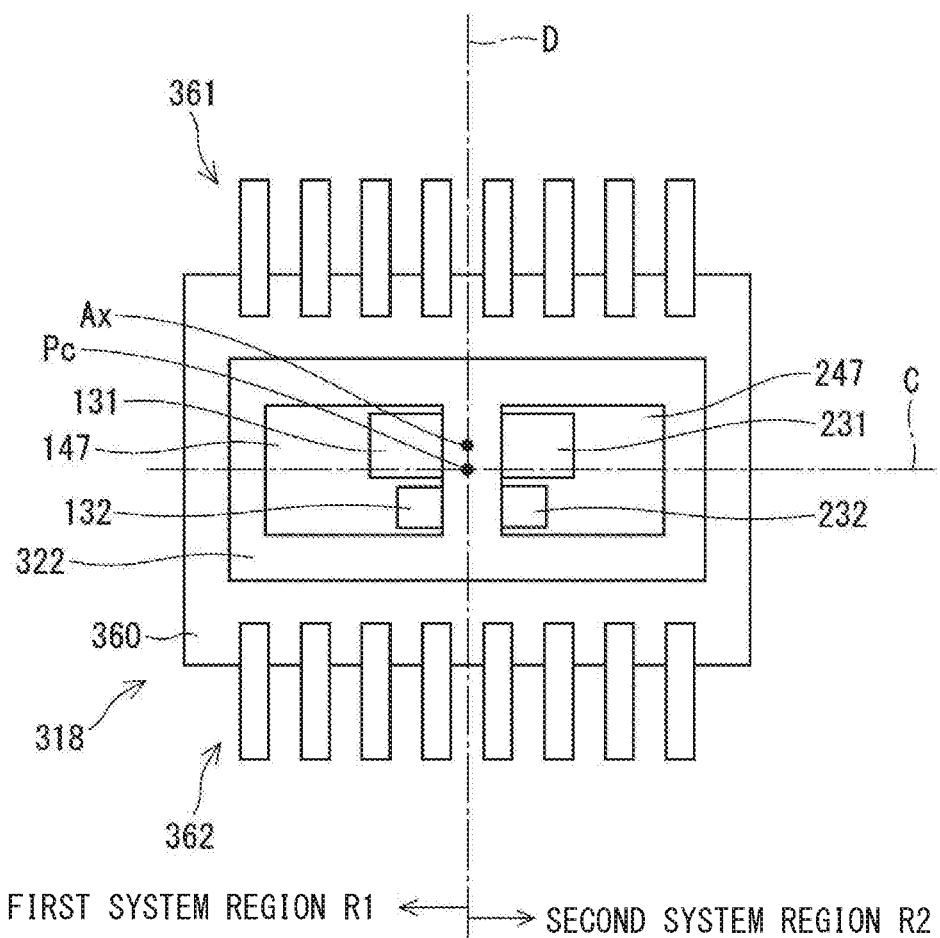
FIG. 32 is a schematic view showing a rotation angle sensor according to an eighteenth embodiment.

Further, as shown in FIG. 31, as in the twelfth embodiment, the package 360 may be mounted on the substrate 470 such that the long side of the package 360 and the boundary line D is parallel to each other. The detection elements 131, 132, 231, 232 may be arranged as shown in FIGS. 28, 30 and 32 described later. The same effects as those of the above embodiments can be obtained even in the configuration described above.

Eighteenth Embodiment

The eighteenth embodiment is shown in FIG. 32. In the rotation angle sensor 318 of the present embodiment, the arithmetic circuit elements 147 and 247 are arranged so as to be separated with the boundary line D interposed therebetween, as in the sixteenth embodiment and the like. The detection elements 131 and 132 are arranged on the arithmetic circuit element 147 and at the end portion on the boundary line D side. The detection elements 231 and 232 are arranged on the arithmetic circuit element 247 and at the end portion on the boundary line D side. The detection elements 131 and 231 for control are arranged on the arithmetic circuit elements 147 and 247 so as to be close to one long side of the package 360, and the detection elements 132 and 232 for abnormality detection are arranged on the arithmetic circuit elements 147 and 247 so as to be close to the other long side of the package 360. The detection elements 131 and 132 and the detection elements 231 and 232 are arranged line-symmetrically with respect to the boundary line D.

The rotation angle sensor 318 is mounted on the substrate 470 such that the axis Ax is in the middle of the detection elements 131 and 231 for control, and the package center Pc is provided on the boundary line D and at a position displaced from the axis Ax. The same effects as those of the above embodiments can be obtained even in the configuration described above.

Nineteenth Embodiment

Figure 33:
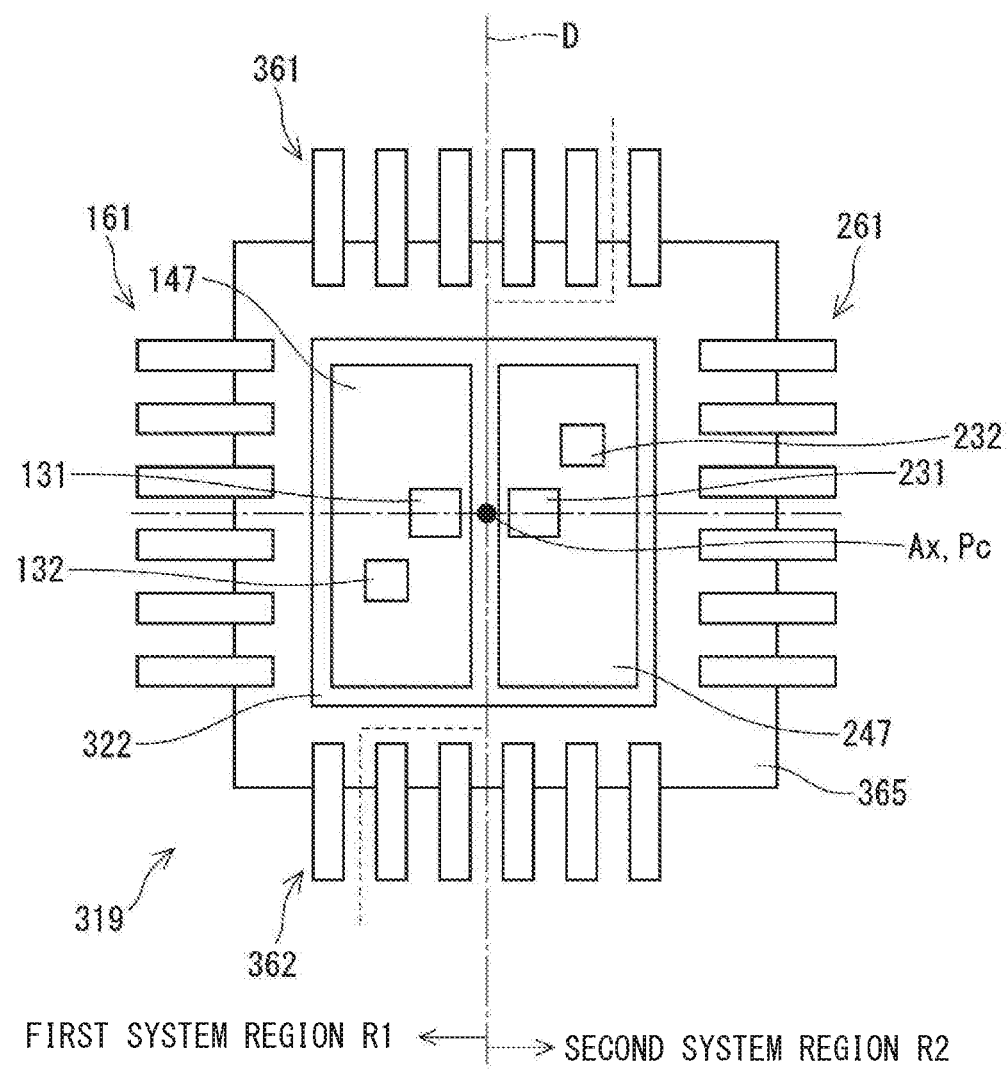
FIG. 33 is a schematic view showing a rotation angle sensor according to a nineteenth embodiment.

The nineteenth embodiment is shown in FIG. 33. In the rotation angle sensor 319 of the present embodiment, the package 365 is formed in a substantially square shape in plan view, and lead terminals are provided on the four sides of the package 365. In the present embodiment, the lead terminal 161 formed on the side of the first system region R1 and the lead terminals 361 and 362, which are formed on the two sides arranged across the system regions R1 and R2 and are further arranged in the first system region R1, are connected to the first control unit 170. In addition, the lead terminal 261 formed on the side of the second system region R2 and the lead terminal 361, 362, which are formed on the two sides extending across the system regions R1 and R2 and are further arranged in the second system region R2, are connected to the second control unit 270.

Further, as divided by broken lines, n (5 in the embodiment of FIG. 33) terminals on the first system region R1 side of the lead terminals 361 may be connected to the first control unit 170, and m (1 in the embodiment of FIG. 33) terminals on the second system region R2 side of the lead terminals 361 may be connected to second control unit 270. In addition, among the lead terminals 362, m terminals on the first system region R1 side may be connected to the first control unit 170, and n terminals on the second system region R2 side may be connected to the second control unit 270. In other words, the sorting of the lead terminals to the first control unit or the second control unit may be symmetric with respect to the boundary line point D or may not be symmetric with respect to the boundary line D. Details of setting n and m are the same as in the fourteenth embodiment. In FIG. 33, as in the sixteenth embodiment, the detection elements 131 and 132 of the first system L1 and the detection elements 231 and 232 of the second system L2 are arranged in point symmetry. However, the detection element may be mounted on both sides, and the element may be arranged in any of the other embodiments. The same effects as those of the above embodiments can be obtained even in the configuration described above.

Here, the magnet 875 corresponds to the "detection target", the rotating magnetic field that changes according to the rotation of the magnet 875 corresponds to the "physical quantity that changes according to the rotation of the detection target", and the axis Ax corresponds to the "detection center". The detection elements 131 and 231 for control correspond to "main detection elements", and the detection elements 132 and 232 for abnormality detection correspond to "sub detection elements". The rotation angles θ1a and θ2a correspond to "main rotation information", and the rotation angles θ1b and θ2b correspond to "sub rotation information". In the embodiment of FIG. 4, the number of rotations TC1 and TC2 may be considered to be included in the "main rotation information". Further, in the embodiment of FIG. 19, it may be considered that the numbers of rotations TC1 and TC2 are included in the "sub rotation information".

The rotation angle sensors 301 to 319 correspond to "detection device", the control units 170 and 270 correspond to "calculation device", the ECU 10 corresponds to "control device", and the batteries 191 and 291 correspond to "voltage source". The comparison of the detected values is performed in the sensor side, and the abnormality determination result as sub rotation information is output to the control unit. After that, the abnormality determination performed based on the abnormality determination result acquired by the control unit is included in the concept of "determining the abnormality of the detection device based on the main rotation information and the sub rotation information".

Other Embodiments

In the above embodiment, the detection device is provided with two or one sensor unit. In other embodiments, the number of sensor units may be three or more. In another embodiment, the driving device may have three or more systems. Further, in other embodiments, the number of detection elements may be five or more. For example, when three detection elements are provided in each system, one detection element may be considered as a main detection element and the remaining two detection elements may be considered as sub detection elements. In the above embodiment, the main detection element is used for control and the sub detection elements are used for abnormality detection. In other embodiments, the main detection element may be used for other than control, for example, the detection value of the sub detection element is also used for control, or the sub detection element may be used for other than abnormality detection.

In the above embodiment, the detection device is the rotation angle sensor that detects the rotation of the motor, and the detection target is the magnet provided on the shaft of the motor. In another embodiment, any detection device may be used as long as it detects a physical quantity that changes according to rotation, and may be, for example, a twin resolver torque sensor that detects a rotating magnetic field or a torque sensor or the like that detects a magnetic field strength. That is, in other embodiments, the detection target is not limited to the motor and may be, for example, a steering shaft.

In the above embodiments, electric power is supplied to the first sensor unit and the second sensor unit from two batteries, respectively and the first sensor unit and the second sensor unit transmit the output signals to two control units, respectively. In other embodiments, electric power may be supplied from a common battery to plural sensor units. In such case, a power source such as a regulator or the like may be provided for each sensor unit or may be shared among the sensor units. In other embodiments, plural sensor units may transmit plural output signals to a common control unit.

In the above embodiment, the motor is a three-phase brushless motor. In other embodiments, the motor unit is not limited to the three-phase brushless motor, and any motor may be used. Further, the motor may also be a generator, or may be a motor-generator having both of a motor function and a generator function, i.e., not necessarily be limited to the rotating electric machine.

In the above-described embodiments, the control device having the detection device is applied to the electric power steering device. In other embodiments, the driving device may be applied to other apparatuses different from the electric power steering device. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

Conventionally, a rotation angle detection device has a plurality of sensor units. For example, in JP 2016-145813 A, a plurality of sensors are arranged point-symmetrically with respect to a rotation center.

When a plurality of sensors are arranged point-symmetrically, the distance between each sensor and the rotation center becomes constant. Therefore, it is necessary to reduce the influence due to magnetic flux distortion by increasing the size and thickness of magnets in order to ensure a detection accuracy of all sensors. An object of the present disclosure is to provide a detection device, a calculation device, a control device, and an electric power steering device using the same, which can secure detection accuracy while suppressing an increase in the size of a detection target.

The invention claimed is:

1. A detection device comprising:
a main detection element configured to detect a physical quantity that changes according to a rotation of a detection target;
a sub detection element configured to detect a physical quantity that changes according to the rotation of the detection target;
a signal processing unit configured to output main rotation information that is information according to a detection value of the main detection element and sub rotation information that is information according to a detection value of the sub detection element; and
a package configured to seal the main detection element, the sub detection element, and the signal processing unit, wherein
centers of the main detection element and the sub detection element are arranged at positions displaced from a detection center of the detection target,
the main detection element is arranged at a position closer to the detection center than the sub detection element,
the package is arranged at a position where a center of the package deviates from the detection center,
the detection value of the main detection element is used for control calculation, and
the detection value of the sub detection element is used for abnormality detection of the main detection element.

2. The detection device according to claim 1, wherein the detection center is located in an area of the package.

3. The detection device according to claim 1, wherein configurations relating to the elements differ between the main detection element and the sub detection element.

4. A control device, comprising:
a detection device according to claim 1; and
a calculation device, wherein
the calculation device includes
a signal acquisition unit configured to acquire the main rotation information and the sub rotation information from the detection device,
a calculation unit configured to perform a control calculation using the main rotation information, and
an abnormality determination unit configured to determine abnormality of the detection device based on the main rotation information and the sub rotation information.

5. The control device according to claim 4, wherein
the calculation device has a plurality of the control units,
when a combination of the main detection element, the sub detection element, and the signal processing unit is referred to as a sensor unit, the sensor unit is provided corresponding to each control unit,
the calculation device performs a control calculation based on the main rotation information acquired from the sensor unit provided corresponding to the control unit, and stops the control calculation in the calculation unit, when the main rotation information is abnormal, and
when the other main rotation information is normal, the control by the control unit that has acquired the normal main rotation information is continued.

6. The control device according to claim 5, wherein
when a combination of the sensor unit and the control unit provided corresponding to the control unit is referred to as a system, electric power is supplied from a separate voltage source for each system.

7. The control device according to claim 4, wherein
the main detection element and the sub detection element detect a rotating magnetic field that changes according to a rotation of a motor, and
the calculation device controls driving of the motor based on the main rotation information.

8. An electric power steering device comprising:
a control device according to claim 7, and
a motor.

9. The electric power steering device according to claim 8, wherein
the main detection element or the sub detection element continues detection even while a vehicle start switch is off, and
the signal processing unit continues to calculate the number of rotations of the motor while the start switch is off.

10. A detection device comprising:
a main detection element configured to detect a physical quantity that changes according to a rotation of a detection target;
a sub detection element configured to detect a physical quantity that changes according to the rotation of the detection target;
a signal processing unit configured to output main rotation information that is information according to a detection value of the main detection element and sub rotation information that is information according to a detection value of the sub detection element; and
a package configured to seal the main detection element, the sub detection element, and the signal processing unit, wherein
centers of the main detection element and the sub detection element are arranged at positions displaced from a detection center of the detection target,
the sub detection element is arranged at a position displaced from a straight line connecting a center of the main detection element and the detection center, and
the main detection element is arranged closer to the detection center than the sub detection element,
the detection value of the main detection element is used for control calculation, and the detection value of the sub detection element is used for abnormality detection of the main detection element.

11. A detection device comprising:
a main detection element configured to detect a physical quantity that changes according to a rotation of a detection target;
a sub detection element configured to detect a physical quantity that changes according to the rotation of the detection target;
a signal processing unit configured to output main rotation information that is information according to a detection value of the main detection element and sub rotation information that is information according to a detection value of the sub detection element; and
a package configured to seal the main detection element, the sub detection element, and the signal processing unit, wherein
centers of the main detection element and the sub detection element are arranged at positions displaced from a detection center of the detection target,
the main detection element is arranged at a position closer to the detection center than the sub detection element,
the package is arranged at a position where a center of the package deviates from the detection center,
the main detection element includes a first main detection element and a second main detection element,
the sub detection element includes a first sub detection element and a second sub detection element,
the first main detection element and the first sub detection element are mounted on one surface of a lead frame, and
the second main detection element and the second sub detection element are mounted on the other surface of the lead frame.

12. The detection device according to claim 11, wherein:
the first main detection element, the second main detection element, the first sub detection element, and the second sub detection element are mounted on one surface of the lead frame.

13. The detection device according to claim 11, wherein:
the first main detection element and the second main detection element are mounted at a same location with the lead frame interposed therebetween.

14. The detection device according to claim 11, wherein:
the package includes a main package that seals the first main detection element and the second main detection element, and a sub package that seals the first sub detection element and the second sub detection element, and
the sub package is arranged at a location which is farther from the detection center than the main package.

15. The detection device according to claim 11, wherein:
the package is provided for each of the main detection elements, and
the first main detection element and the second main detection element are mounted on both sides of a substrate such that the first and second main detection elements are mounted at the same location with the substrate interposed therebetween.

16. The detection device according to claim 11, wherein the first main detection element and the second main detection element are mounted on a board partitioned into a first system area and a second system area, and the package is arranged such that the first main detection element is located in the first system area and the second main detection element is located in the second system area.

17. The detection device according to claim 16, further comprising:
lead terminals provided on an outer edge of the package, wherein
the lead terminal arranged on the first system area side outputs a signal related to a detection value of the first main detection element, and
the lead terminal arranged on the second system area side outputs a signal related to a detection value of the second main detection element.

18. The detection device according to claim 11, wherein
the first main detection element and the second main detection element are mounted on a board partitioned into a first system area and a second system area, and
the first main detection element and the second main detection element are arranged on a boundary line that divides the first system area and the second system area.

19. The detection device according to claim 11, wherein
the detection value of the main detection element is used for control calculation, and
the detection value of the sub detection element is used for abnormality detection of the main detection element.

20. A detection device comprising:
a main detection element configured to detect a physical quantity that changes according to a rotation of a detection target;
a sub detection element configured to detect a physical quantity that changes according to the rotation of the detection target;
a signal processing unit configured to output main rotation information that is information according to a detection value of the main detection element and sub rotation information that is information according to a detection value of the sub detection element; and
a package configured to seal the main detection element, the sub detection element, and the signal processing unit, wherein
centers of the main detection element and the sub detection element are arranged at positions displaced from a detection center of the detection target,
the main detection element is arranged at a position closer to the detection center than the sub detection element, and
the package is arranged at a position where a center of the package deviates from the detection center,
the main detection element includes a first main detection element and a second main detection element,
the sub detection element includes a first sub detection element and a second sub detection element,
the first main detection element and the first sub detection element are mounted on one surface of a lead frame, and
the second main detection element and the second sub detection element are mounted on the other surface of the lead frame.

* * * * *